US009032097B2

(12) United States Patent
Albanese et al.

(10) Patent No.: US 9,032,097 B2
(45) Date of Patent: May 12, 2015

(54) DATA COMMUNICATION WITH REMOTE NETWORK NODE

(75) Inventors: Michael J. Albanese, San Jose, CA (US); James Roland Henderson, Morgan Hill, CA (US); Keith Barraclough, Mountain View, CA (US); David Irvine, San Jose, CA (US); Rodrigo Philander, Sunnyvale, CA (US)

(73) Assignee: Nokia Corporation, Espoo (FI)

( * ) Notice: Subject to any disclaimer, the term of this patent is extended or adjusted under 35 U.S.C. 154(b) by 1138 days.

(21) Appl. No.: 11/219,529

(22) Filed: Sep. 2, 2005

(65) Prior Publication Data
US 2006/0112188 A1 May 25, 2006

Related U.S. Application Data

(63) Continuation-in-part of application No. 09/843,249, filed on Apr. 26, 2001, now Pat. No. 7,139,834, and a continuation-in-part of application No. 11/056,345, filed on Feb. 11, 2005.

(51) Int. Cl.
G06F 15/16 (2006.01)
H04L 29/08 (2006.01)
(Continued)

(52) U.S. Cl.
CPC ............... *H04L 67/06* (2013.01); *G06F 21/33* (2013.01); *G06F 21/55* (2013.01); *H04L 12/2807* (2013.01); *H04L 45/00* (2013.01); *H04L 63/08* (2013.01); *H04L 63/102* (2013.01); *H04L 63/126* (2013.01); *H04W 4/02* (2013.01); *H04W 4/021* (2013.01); *H04W 4/185* (2013.01); *H04L 67/2804* (2013.01); *H04L 67/2823* (2013.01); *H04L 67/303* (2013.01); *H04L 67/025* (2013.01); *H04L 67/2819* (2013.01); *H04L 67/2828* (2013.01); *H04L 67/2842* (2013.01); *H04L 67/18* (2013.01); *H04L 67/10* (2013.01); *H04L 67/327* (2013.01); *H04L 67/2857* (2013.01); *H04L 67/289* (2013.01)

(58) Field of Classification Search
USPC .................... 709/213, 217, 219, 246; 341/50; 370/466, 467
See application file for complete search history.

(56) References Cited

U.S. PATENT DOCUMENTS 4,979,118 A 12/1990 Kheradpir
5,774,660 A 6/1998 Brendel et al.
(Continued)

FOREIGN PATENT DOCUMENTS

EP 1 376 398 A2 1/2004
JP 2002-132455 A 5/2002
(Continued)

OTHER PUBLICATIONS

Supplementary European Search Report, PCT/US2007068985, Dec. 15, 2009, pp. 1-9.
(Continued)

*Primary Examiner* — Douglas Blair
(74) *Attorney, Agent, or Firm* — Ditthavong & Steiner, P.C.

(57) ABSTRACT

Data transfer between remote and base locations over a network is effected. According to an example embodiment of the present invention, a data router controls the routing of data between base and remote network appliances as a function of metadata describing the data and capabilities of the remote network appliance.

35 Claims, 4 Drawing Sheets

(51) Int. Cl.
*G06F 21/33* (2013.01)
*G06F 21/55* (2013.01)
H04L 12/701 (2013.01)
H04L 29/06 (2006.01)
*H04L 12/28* (2006.01)
*H04W 4/02* (2009.01)
*H04W 4/18* (2009.01)

(56) References Cited

U.S. PATENT DOCUMENTS

| | | | |
|---|---|---|---|
| 5,862,325 A * | 1/1999 | Reed et al. | 709/201 |
| 5,920,701 A | 7/1999 | Miller et al. | |
| 5,996,022 A * | 11/1999 | Krueger et al. | 709/247 |
| 6,006,264 A | 12/1999 | Colby et al. | |
| 6,032,227 A | 2/2000 | Shaheen et al. | |
| 6,052,718 A | 4/2000 | Gifford | |
| 6,067,565 A | 5/2000 | Horvitz | |
| 6,112,225 A | 8/2000 | Kraft et al. | |
| 6,161,133 A | 12/2000 | Kikinis | |
| 6,167,438 A | 12/2000 | Yates et al. | |
| 6,240,453 B1 | 5/2001 | Chang et al. | |
| 6,298,373 B1 | 10/2001 | Burns et al. | |
| 6,304,909 B1 | 10/2001 | Mullaly et al. | |
| 6,304,913 B1 | 10/2001 | Rune | |
| 6,308,209 B1 | 10/2001 | Lecheler | |
| 6,308,222 B1 * | 10/2001 | Krueger et al. | 709/247 |
| 6,360,333 B1 | 3/2002 | Jansen et al. | |
| 6,407,680 B1 * | 6/2002 | Lai et al. | 341/50 |
| 6,470,189 B1 | 10/2002 | Hill et al. | |
| 6,473,404 B1 | 10/2002 | Kaplan et al. | |
| 6,490,625 B1 | 12/2002 | Islam et al. | |
| 6,493,758 B1 * | 12/2002 | McLain | 709/227 |
| 6,496,980 B1 | 12/2002 | Tillman et al. | |
| 6,505,160 B1 * | 1/2003 | Levy et al. | 704/270 |
| 6,516,192 B1 | 2/2003 | Spaur et al. | |
| 6,577,601 B1 | 6/2003 | Wolpert | |
| 6,593,860 B2 * | 7/2003 | Lai et al. | 341/50 |
| 6,678,244 B1 | 1/2004 | Appanna et al. | |
| 6,697,333 B1 | 2/2004 | Bawa et al. | |
| 6,732,180 B1 | 5/2004 | Hale et al. | |
| 6,751,664 B1 | 6/2004 | Kogan et al. | |
| 6,826,597 B1 * | 11/2004 | Lonnroth et al. | 709/207 |
| 6,850,980 B1 | 2/2005 | Gourlay | |
| 6,871,236 B2 * | 3/2005 | Fishman et al. | 709/246 |
| 6,888,477 B2 * | 5/2005 | Lai et al. | 341/50 |
| 6,915,328 B2 | 7/2005 | Turnbull | |
| 6,920,637 B2 | 7/2005 | Mason et al. | |
| 6,937,168 B2 * | 8/2005 | Rao et al. | 341/50 |
| 6,993,508 B1 | 1/2006 | Major et al. | |
| 6,996,720 B1 | 2/2006 | DeMello et al. | |
| 7,010,500 B2 | 3/2006 | Aarnio | |
| 7,035,828 B2 * | 4/2006 | Ketonen et al. | 705/51 |
| 7,075,919 B1 | 7/2006 | Wendt et al. | |
| 7,120,702 B2 * | 10/2006 | Huang et al. | 709/246 |
| 7,133,925 B2 * | 11/2006 | Mukherjee et al. | 709/231 |
| 7,200,680 B2 * | 4/2007 | Evans et al. | 709/246 |
| 7,222,292 B2 | 5/2007 | Ali et al. | |
| 7,237,029 B2 | 6/2007 | Hino et al. | |
| 7,254,602 B2 | 8/2007 | Boivie | |
| 7,287,214 B1 | 10/2007 | Jenkins et al. | |
| 7,293,115 B2 | 11/2007 | DaCosta et al. | |
| 7,299,362 B2 | 11/2007 | Shen et al. | |
| 7,340,500 B2 | 3/2008 | Traversat et al. | |
| 7,356,615 B2 * | 4/2008 | Cai et al. | 709/246 |
| 7,483,958 B1 | 1/2009 | Elabbady et al. | |
| 7,502,819 B2 | 3/2009 | Alonso | |
| 7,805,315 B2 | 9/2010 | Goel | |
| 7,827,312 B2 * | 11/2010 | Ramaswamy et al. | 709/246 |
| 7,895,445 B1 | 2/2011 | Albanese et al. | |
| 7,917,628 B2 | 3/2011 | Hesselink et al. | |
| 7,961,645 B2 | 6/2011 | Gudipudi et al. | |
| 8,042,163 B1 | 10/2011 | Karr et al. | |
| 2001/0011349 A1 | 8/2001 | Garrison | |
| 2001/0047400 A1 | 11/2001 | Coates et al. | |
| 2002/0016922 A1 | 2/2002 | Richards et al. | |
| 2002/0026491 A1 | 2/2002 | Mason et al. | |
| 2002/0040389 A1 | 4/2002 | Gerba et al. | |
| 2002/0052798 A1 | 5/2002 | Nishikado et al. | |
| 2002/0052855 A1 | 5/2002 | Landesmann | |
| 2002/0052885 A1 | 5/2002 | Levy | |
| 2002/0056004 A1 | 5/2002 | Smith et al. | |
| 2002/0073057 A1 | 6/2002 | Benoit et al. | |
| 2002/0083342 A1 | 6/2002 | Webb et al. | |
| 2002/0099796 A1 | 7/2002 | Chou | |
| 2002/0103934 A1 | 8/2002 | Fishman et al. | |
| 2002/0107807 A1 | 8/2002 | Ketonen et al. | |
| 2002/0120574 A1 | 8/2002 | Ezaki | |
| 2002/0120607 A1 | 8/2002 | Price et al. | |
| 2002/0124098 A1 | 9/2002 | Shaw | |
| 2002/0133570 A1 | 9/2002 | Michel | |
| 2002/0133626 A1 | 9/2002 | Turnbull | |
| 2002/0161835 A1 | 10/2002 | Ball et al. | |
| 2002/0174246 A1 | 11/2002 | Tanay et al. | |
| 2002/0194324 A1 | 12/2002 | Guha | |
| 2003/0046401 A1 | 3/2003 | Abbott et al. | |
| 2003/0046703 A1 | 3/2003 | Knowles et al. | |
| 2003/0061387 A1 * | 3/2003 | Brown et al. | 709/246 |
| 2003/0088544 A1 | 5/2003 | Kan et al. | |
| 2003/0088686 A1 | 5/2003 | Jennings | |
| 2003/0110234 A1 * | 6/2003 | Egli et al. | 709/217 |
| 2003/0119386 A1 | 6/2003 | Laux et al. | |
| 2003/0177269 A1 * | 9/2003 | Robinson et al. | 709/246 |
| 2003/0194998 A1 | 10/2003 | Bhide | |
| 2003/0200337 A1 * | 10/2003 | Jabri et al. | 709/246 |
| 2003/0204602 A1 | 10/2003 | Hudson et al. | |
| 2004/0003132 A1 | 1/2004 | Stanley et al. | |
| 2004/0032348 A1 * | 2/2004 | Lai et al. | 341/50 |
| 2004/0049462 A1 | 3/2004 | Wang | |
| 2004/0117845 A1 | 6/2004 | Karaoguz et al. | |
| 2004/0122958 A1 | 6/2004 | Wardrop | |
| 2004/0139233 A1 * | 7/2004 | Kellerman et al. | 709/246 |
| 2004/0148434 A1 | 7/2004 | Matsubara et al. | |
| 2004/0148503 A1 | 7/2004 | Sidman | |
| 2004/0181706 A1 | 9/2004 | Chen et al. | |
| 2004/0199667 A1 | 10/2004 | Dobbins | |
| 2004/0243839 A1 | 12/2004 | Bhatia et al. | |
| 2004/0250291 A1 * | 12/2004 | Rao et al. | 725/131 |
| 2004/0267954 A1 * | 12/2004 | Shen | 709/231 |
| 2005/0033850 A1 | 2/2005 | Kirkland | |
| 2005/0131871 A1 | 6/2005 | Howard et al. | |
| 2005/0132264 A1 * | 6/2005 | Joshi et al. | 715/500.1 |
| 2005/0148319 A1 | 7/2005 | Himeno | |
| 2005/0256870 A1 | 11/2005 | Benco et al. | |
| 2006/0117018 A1 | 6/2006 | Christiansen et al. | |
| 2006/0120385 A1 | 6/2006 | Atchison et al. | |
| 2006/0168318 A1 | 7/2006 | Twiss | |
| 2006/0173974 A1 | 8/2006 | Tang | |
| 2006/0242325 A1 * | 10/2006 | Ramaswamy et al. | 709/246 |
| 2007/0159976 A1 | 7/2007 | Dekeyzer et al. | |
| 2007/0174471 A1 | 7/2007 | Van Rossum | |
| 2007/0288247 A1 | 12/2007 | Mackay | |
| 2007/0299681 A1 | 12/2007 | Plastina et al. | |
| 2008/0049642 A1 | 2/2008 | Gudipudi et al. | |
| 2008/0052415 A1 * | 2/2008 | Kellerman et al. | 709/246 |
| 2008/0060038 A1 | 3/2008 | Stallings et al. | |

FOREIGN PATENT DOCUMENTS

JP 2002-351729 A 12/2002
WO WO 01/03373 A1 1/2001

OTHER PUBLICATIONS

BackWeb Foundation 5.5 Technical White Paper, Nov. 1999, pp. 1-49.
Chinese Office action for correspondiong CN app. No. 200680041085.1 dated Jul. 9, 2010, pp. 1-22.
Chinese Office action for correspondiong CN app. No. 200680041085.1 dated Jul. 17, 2009, pp. 1-21.
GPS to do wonders for wireless browsing, Hammer, May 25, 2000, pp. 1-3.
European Office action for corresponding EP application No. 06718618.9-2413 dated Jan. 21, 2011, 1 page.

(56) References Cited

OTHER PUBLICATIONS

European Office action for corresponding EP application No. 06801968.6-2413 dated Feb. 1, 2011, 1 page.
Extended European search report for corresponding EP application No. 06718618.9-2413 dated Jan. 4, 2011, pp. 1-9.
Extended European search report for corresponding EP application No. 06801968.6-2413 dated Jan. 14, 2011, pp. 1-10.
Server-directed transcoding, Mogul, J. C., Computer Communications 24, 2001, Elsevier, pp. 155-162.
Office action for related U.S. Appl. No. 11/051,458 dated Mar. 8, 2011, pp. 1-41.
Office action for related U.S. Appl. No. 11/835,061 dated Mar. 2, 2011, pp. 1-20.
Office action for related U.S. Appl. No. 11/435,357 dated Jul. 29, 2010, pp. 1-24.
Office action for related U.S. Appl. No. 11/835,061 dated Sep. 15, 2010, pp. 1-22.
Final Office Action for related U.S. Appl. No. 11/051,458, Aug. 18, 2011, pp. 1-18.
Office Action for related U.S. Appl. No. 11/374,409, Jun. 8, 2011, pp. 1-31.
Office Action for related U.S. Appl. No. 11/408,140, Jul. 13, 2011, pp. 1-33.
Office Action for related U.S. Appl. No. 11/700,345, Jun. 10, 2011, pp. 1-51.
Office Action for related U.S. Appl. No. 11/835,061, Jul. 13, 2011, pp. 1-30.
Russian Office action for corresponding RU application No. 2008149517/08(064991) dated May 20, 2011, pp. 1-11.
Office Action for Japanese Application No. 2009-511211 dated Oct. 4, 2011, pp. 1-5.
Office Action for U.S. Appl. No. 11/374,409 dated Oct. 28, 2011, pp. 1-19.
Office Action for U.S. Appl. No. 11/700,345 dated Nov. 18, 2011, pp. 1-39.
Final Rejection for related U.S. Appl. No. 11/700,345 dated May 17, 2012, pp. 1-38.
Office Action for related European Application No. 07 797 483.0 dated May 3, 2012, pp. 1-5.
Office Action for related U.S. Appl. No. 11/435,344 dated May 3, 2012, pp. 1-23.
Office Action for related U.S. Appl. No. 11/835,061 dated Jun. 7, 2012, pp. 1-15.
Office Action for related U.S. Appl. No. 11/408,140 dated Aug. 3, 2012, pp. 1-23.
Examiner's Answer to Appeal Brief for related U.S. Appl. No. 11/835,061 dated Nov. 20, 2012, pp. 1-22.
Final Rejection for related U.S. Appl. No. 11/435,344 dated Oct. 26, 2012, pp. 1-25.
Office Action for related U.S. Appl. No. 11/056,345 dated Dec. 10, 2012, pp. 1-52.
Office Action for related Korean Patent Application No. 2008-7030536 dated Jan. 4, 2013, pp. 1-7.

* cited by examiner

DATA COMMUNICATION WITH REMOTE NETWORK NODE

RELATED PATENT DOCUMENTS

This patent document is a continuation-in-part of U.S. patent application Ser. No. 09/843,249 entitled "Data Routing Monitoring and Management," filed Apr. 26, 2001 now U.S. Pat. No. 7,139,834, and of U.S. patent application Ser. No. 11/056,345 entitled "Network-distributed Data Routing," filed Feb. 11, 2005, to each of which priority is claimed under 35 U.S.C. §120 for common subject matter.

FIELD OF THE INVENTION

The present invention relates generally to data communications between remotely-situated data terminals or nodes and, more particularly, to the presentation of application-specific data with a remote network node via a network such as the internet.

BACKGROUND OF THE INVENTION

As access to the Internet and other communications networks becomes easier, convenient and more readily available, these networks are increasingly used for applications involving the transfer of data such as images, audio, video and other types of streaming data, text and other content. For example, data for computer software, music, video, news services, games and other applications is being requested and delivered via the Internet and, for many applications, via wireless networks such as those implemented for cellular telephone networks.

Content (e.g., audio, images or video) has evolved in application and is readily stored electronically. For example, the storage of music in rewritable electronic media has become a popular method in which to maintain and access music collections. Another example involves video applications, where digital recording and storage of television and personal video collections has become popular. Photos are often stored and accessed electronically, instead of relying upon conventional printed photos and physical photo albums.

As the electronic storage of content and other data grows in popularity, access to the data as well as convenient manners in which to store the data and become increasingly important. For example, sales of music in downloadable audio formats are becoming increasingly popular. Digital audio players based in the home or office or mobile players that can be used in autos, laptop computers, personal listening devices and others are used for playback of this downloaded music. In order to play the music, audio data is loaded onto mobile players or local computers and used to locally play the music. Typically, the amount of storage space required for storing a large volume of audio data exceeds the memory capacity of digital audio players, computers or other appliances capable of playing music. In this regard, the management and use of audio, as well as other data such as image data and video data, has become increasingly burdensome in view of the demand for and use of this data.

As applied to conventional documents and other types of data (e.g., text-based documents, spreadsheets or presentations), the demand for flexible and efficient access to such data has also grown. For example, many workplaces have become increasingly mobile; employees are often working from a remote location such as at home or at traveling locations. Access to data from remote locations has been particularly useful for facilitating mobility while maintaining a desirable level of access to information. However, the growing size of data files desirably transferred to facilitate mobility or to otherwise provide flexible data access has presented challenges to the delivery of such data over communications channels. For instance, email is generally limited in its ability to transfer large data files, such as audio, video, text and presentation files.

For many communication applications, the increase in use and lack of availability of data transfer approaches requires the creative use of communications channels and data. To meet these and other data transfer needs, networks have been enhanced both in the ability to process larger quantities of data and in the ability to process data at a higher rate of speed. In addition, network access appliances have been improved to increase the speed at which data can be processed and transferred. However, as the demand for high quantity data transfer increases, these needs become more difficult to meet.

One challenge to data transfer on the Internet stems from the inflexibility of data transfer channels. For example, if a data supplier sells data to an end user via the Internet, the end user typically downloads the data using one of only a handful of download locations operated at the control of the supplier. This type of operation can be cumbersome and expensive because the data may have to travel a significant distance and thus take up more time and space in the communications network. In addition, the transfer of data is limited by the location of the download locations.

Another challenge to the effective transfer and management of data is related to the provision of data at an acceptable transfer rate (e.g., as related to bandwidth). Certain network access appliances are limited in their ability to process audio data at different speeds, either by their internal configurations or by the availability of network access. For instance, mobile (wireless) type network access appliances can be limited by the available connectivity to mobile networks. In addition, certain network appliances may be adaptable for wired and wireless communications, with their respective ability to access data being relatively higher (e.g., faster) via wired communications, relative to wireless; when these appliances are operating via wireless communications, they may be able to receive data at a lower speed, or bitrate.

Yet another challenge to data transfer and management stems from the existence of a myriad of different types of data, as well as different types of data access appliances. For example, a variety of different data types are implemented for storing audio files. Often, these data types are associated with a particular type of digital audio device that is being used for playback. In addition, with each data type, there are often different manners in which the data is stored, typically involving different levels of quality (e.g., with different playback bitrates). In this regard, a digital audio player must not only have access to data but also have access to data in a particular format.

Still another challenge to network data transfer involves the management of media rights associated with digital rights management (DRM). As discussed above, digital media such as audio or video can be purchased via electronic delivery. In order to inhibit and/or prevent copying, distribution or other unauthorized use of data, security precautions are taken. In some applications, these security precautions require specific approaches to enable playback, which can further exacerbate difficulties associated with data transfer and subsequent use (e.g., playback).

Effectively and efficiently managing data transfer via communication networks has been challenging in the face of the advancement of technologies and trade channels that use or could use network-based data transfer. In addition, the limitations of previous approaches restrict the ability to meet the demand of transferring such data between data terminals in a reliable, secure, efficient and affordable manner.

SUMMARY OF THE INVENTION

The present invention is directed to approaches to data routing, management and associated applications for making application-type content available at a remote device. The present invention is exemplified in a number of implementations and applications, some of which are summarized below.

According to an example embodiment of the present invention, an approach to data routing involves the establishment of a communications route between a user's base (e.g., home or office) data storage/processing arrangement and a remote network access appliance, with data transfer via the communications route facilitated with remote application-based configuration functions.

According to another example embodiment of the present invention, an internet-based routing server facilitates the delivery of content between a base network node and a remote network access appliance. A host application running at the routing server is configured for interacting with the remote network access appliance using an authentication approach to control the remote network access appliance's ability to access the base network node. When a remote network access appliance is authenticated for accessing a particular base network node, the host application further ascertains program information indicative of capabilities at the remote network access appliance. Using the identified capabilities, a plug-in at the host application interacts with a content application at the base network node, using metadata associated with the content application, to facilitate the configuration and transfer of content from the base network node to the remote network access appliance.

In one implementation, the routing server is a network-distributed routing server implemented in a network-based server node and in a plurality of base network nodes. Each base network node (e.g., where a base "node" may include two or more internet access appliances in a shared location or different locations) is assigned particular access characteristics. These access characteristics are used by remote network access appliances, typically those of an individual associated with the base network node, to access content at the base network node, with the accessed data configured for use with an available program at a remote network access appliance.

According to another example embodiment of the present invention, a network communication system facilitates the communication of application-specific data between base and remote network appliances via the Internet, and the presentation of the application-specific data at the remote network appliances. The system includes a network server arrangement that receives data transfer requests via the Internet and associates the received data transfer requests with a base network appliance. The associated data transfer requests are authenticated as a function of authentication data for the base network appliance and data in the request, and each authenticated data transfer request is passed to an associated base network appliance via the Internet. Each associated base network appliance includes a data router that responds to authenticated requests received via the Internet from the network server arrangement. Using metadata at the base network appliance, the data router identifies application-specific data corresponding to the request. The identified application-specific data is transcoded from a first format type to a second Internet-communication format type, with the second format type being compatible with one of the remote network appliances. The transcoded data is then sent to the one of the remote network appliances.

According to another example embodiment of the present invention, application-specific data is communicated between base and remote network appliances via the Internet and presented at a remote network appliance. At network server, data transfer requests are received via the Internet and associated with a base network appliance. The associated data transfer requests are authenticated as a function of authentication data for the base network appliance and data in the request, and each authenticated data transfer request is passed to an associated base network appliance via the Internet. At each associated base network appliance, and in response to received authenticated requests, metadata is used to identify application-specific data corresponding to the request. The identified application-specific data is transcoded from a first format type to a second Internet-communication format type, the second format type being compatible with one of the remote network appliances. The transcoded data is then sent to the one of the remote network appliances.

In another example embodiment of the present invention, data is communicated between base and remote network appliances as follows. Metadata identifying application-specific characteristics of data stored at the base network appliance is stored. A user at a remote network appliance is authenticated, and at least one asset space is populated with an identification of data stored at the base network appliance as a function of the stored metadata and the authenticated user. The at least one asset space is presented to the authenticated user for use in selecting stored data for transfer. In response to receiving a request for data identified in the asset space, the data is transcoded from a first MIME type into a second MIME type as a function of an application program available at a remote network appliance identified in the request, and the transcoded data is communicated to the remote network appliance.

The above summary of the present invention is not intended to describe each illustrated embodiment or every implementation of the present invention. The figures and detailed description that follow more particularly exemplify these embodiments.

BRIEF DESCRIPTION OF THE DRAWINGS

The invention may be more completely understood in consideration of the detailed description of various embodiments of the invention that follows in connection with the accompanying drawings, in which.

Figure 1:
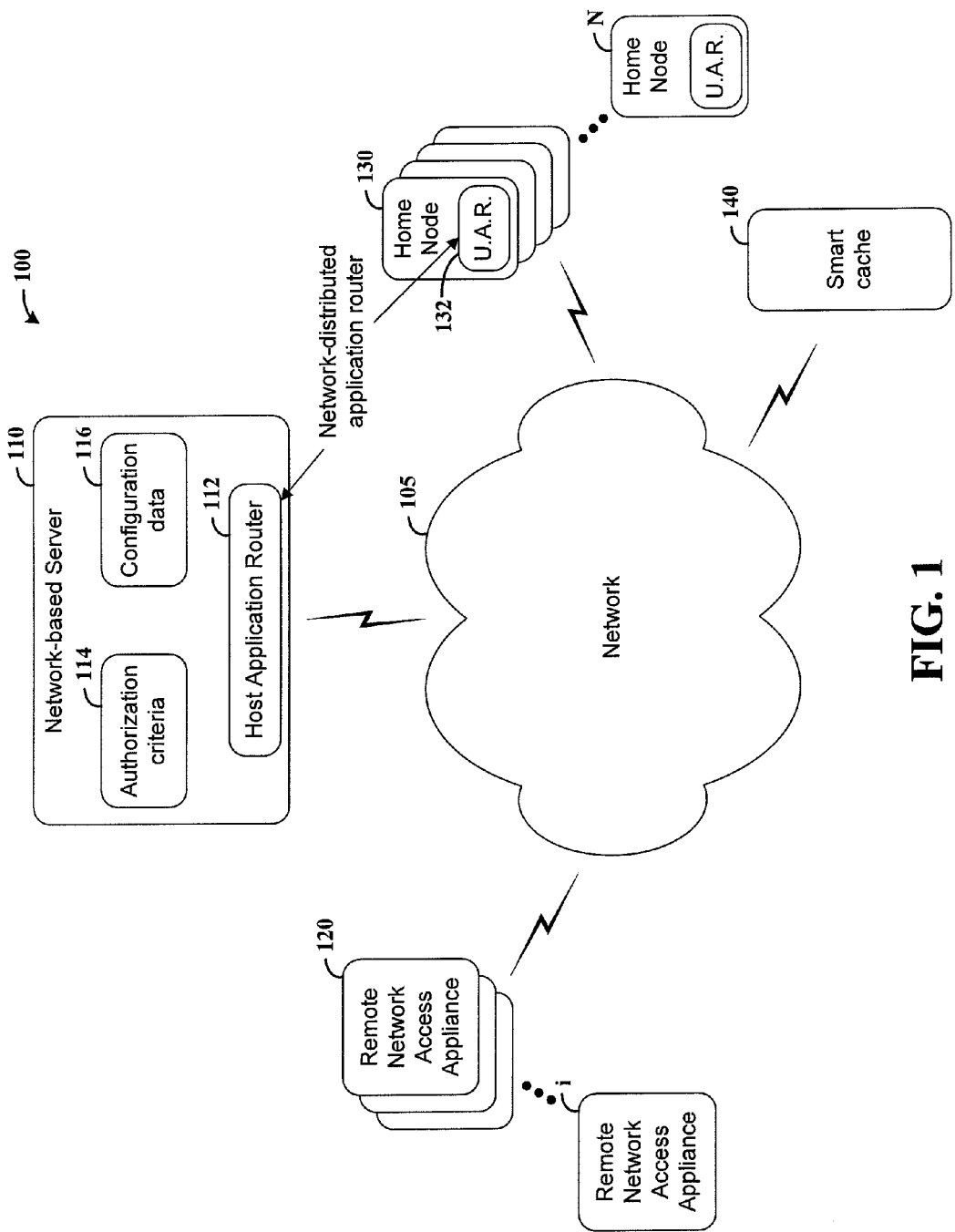
FIG. 1 is a system for routing data via an internet protocol network using a server-hosted interface access approach, according to an example embodiment of the present invention.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION

The present invention is believed to be applicable to a variety of different types of communications, and the invention has been found to be particularly suited for content routing on a network such as the Internet, as a function of display and/or operational characteristics of a remote device involved with the routing. While the present invention is not necessarily limited to such applications, various aspects of the invention may be appreciated through a discussion of various examples using this context.

According to an example embodiment of the present invention, a peer-to-peer network routing system is adapted for selectively communicating data between a base network node and a user at a remote network access appliance via which the user has been granted access to the base network node.

A host server provides a personal network service that connects a user, with software implemented at a base network node, to data available at the base network node. The host server facilitates an intelligent interface accessible by the network access appliance and further facilitates the selection and delivery of data from the base network node to the network access appliance. Selected data is configured for use at the at the remote network access appliance using information characterizing programming available at the remote network access appliance. That is, application-specific data and any associated metadata (i.e., information characterizing the application-specific data) is used to provide access to (e.g., display of) the data at the remote network access appliance without necessarily implementing the application to which the data is specific. With this approach, a user at the remote network access appliance is thus connected to a base network node in the sense that the user can receive information stored at the base network node, directly and/or via the host server.

In some applications, the above-discussed approach can be facilitated via a remote network access appliance that need not necessarily understand or process application-specific information in order to display or otherwise make application-specific information available. In this regard, data created with and/or stored in connection with a particular software program at the base network node (application-specific data) can be viewed or otherwise accessed at the remote network access appliance, without necessarily using the particular software program at the remote network access appliance. The data at the base network node is transcoded, such as by placing the data into a MIME type that can be sent over the Internet to a remote network appliance. In this context, a "MIME type" refers to a format that facilitates the transfer of data such as images, graphics files or text over the Internet, such that the files can be viewed using an Internet browser application (e.g., without necessarily implementing a software program used to create the data).

In general, application-specific data is content that a user typically uses an application to manage. This content may include, for example, data specific to a particular program application, or a type of data that can be implemented with a variety of program applications. For instance, email messages are managed by a mail reader application, music may be managed by a music library application or player, and images may be managed by an album application; each of these applications involve data specific to the applications (application-specific data). In some cases, these applications manage content metadata and contain a pointer to the content on the file system. In other cases these applications manage both content metadata and the content in a single database. In each of these cases, the metadata is used to access the content for presentation to a remote user, and in many instances, for presentation to a remote user not having an application that manages the content.

Various approaches for delivering data to the remote network access appliance are implemented in connection with different applications, depending upon the conditions surrounding each application and other relevant concerns. In each application, the host server controls the routing of data from the base network node (and other base network nodes). In one delivery example, software at the base network node is configured to make the data available to the host server, with the host server retrieving the data from the base network node and passing the retrieved data to the remote network access appliance. In another delivery example, software at the base network node makes data available directly to the remote network access appliance using, for example, an internet interface provided by the host server.

Access to data at each base network node is controlled by the host server using an authorization criterion to limit access to the base network node. Where user-specific criteria, such as identification (e.g., user name) and security code (e.g., a password) are used, this information may be stored at a remote network access appliance and automatically provided to the host server, at the host server (or elsewhere on the network) or input by a user at the remote network access appliance. In some applications, identification characteristics specific to each remote network access appliance is used as authorization criterion, with such identification information provided by the remote network access appliances to the host server. For instance, where the remote network access appliance includes a mobile telephone, the telephone number may be used to grant access to data at the base network node. Other identifiers can also be used to grant access, such as a user identification number of a mobile phone or the identification of a network access appliance. In other applications, a combination of identification information specific to a remote network access appliance (e.g., a telephone number) and user-specific criteria, such as a password and/or identification, are used in controlling access to data at the base network node.

In some applications, the authorization criterion is implemented to grant specific access to limited portions of data available at the base network node. Where appropriate, metadata associated with data available at the base network node is selectively implemented to facilitate such limited access. Characteristics of the remote network access appliance (e.g., its available capabilities) may also be used in connection with authorization criterion for granting access to the data. For example, where a base user grants access to data at the base network node to a remote user, the base user may wish to limit the remote user's access to select data. In this regard, authorization is provided for the remote user (e.g., as associated with the remote user's identification and password) to limited portions of data available to the base network node. This approach can be implemented, for example, where a base user wishes to share selected pictures with a particular remote user; the base user configures software at the base node and/or at the host server to grant access to these selected pictures (e.g., by referencing the pictures or placing them in a particular directory). In some applications, grating access may involve granting access to application-specific selections made to characterize data, with metadata identifying the data associated with the characterization (e.g., where a user wishes to share only pictures tagged with a particular metadata-type identification, such as "my pictures"). With the granted access, the remote user can access and view the selected pictures via a remote network access appliance.

As described in connection with the above and other various example embodiments and implementations described herein, the base network node may include, for example, one or more of a personal computer, set top box, web camera, secure monitoring system and/or content storage system at a home or business location with network (e.g., Internet) access. In this context, a "user" at a remote network access appliance may include one or more individuals, such as members of a household, employees of a business entity or simply an individual given access authorization by a user associated with the base network node. Further, a "user" may be a machine functioning automatically, e.g., as programmed by an individual.

In another embodiment, the host server and/or software implemented at a base network node facilitates the protection of rights associated with data stored at the base network. These rights, such as those rights often referred to as digital rights management (DRM), are often associated with copyright or other laws regulating the use and/or distribution of data. In some instances, rights are simply associated with a desire to protect personal and/or confidential information. In this regard, one or both of the host server and software implemented on the base network node implements approaches relative to the protection of these rights.

One example application involving the protection of data relates to the distribution of music. Where music is protected, the host server and/or base network node can be programmed with distribution control programming that ensures that delivery of the music via the network is usable by the remote network access appliance and, in some instances, protected. In some applications, the music is delivered to the remote network access appliance in an original protected format, such as that in which music is delivered (upon purchase) via the internet. In applications where the remote network access appliance is unable to use the data in the original protected format, the host server and/or the base network node may remove the original protection and send the data in an unprotected format. In other applications, original protection is removed and data is re-protected using a protection scheme usable by the remote network access appliance; this approach is useful, for example, where protected delivery is desirable but wherein delivery in an original protected format is not. In this regard, a user storing music on his or her base network node (e.g., a PC) can access the music via a remote network appliance (e.g., a mobile telephone) while maintaining assurance that the music is properly distributed in view of media rights and/or characteristics of the remote network access appliance.

In some applications, the delivery of data such as media content involves configuration of the content into a format that is amenable to delivery to and/or use at the remote network access appliance. For example, where a remote network access appliance is capable of displaying pictures in a particular format, pictures requested by the remote network access appliance are appropriately formatted so that the remote network access appliance can display the pictures. In addition, where data transfer rate is limited by available connections (bandwidth), pictures may be formatted so that each picture requires a relatively lesser amount of data (e.g., high resolution images are formatted to a lower resolution to reduce image data size, prior to transfer). As another example, when audio data such as music is requested and the remote network access appliance is adapted for playing audio data in a particular digital audio format (e.g., mp3 format), requested audio data is formatted into the particular digital audio format.

In another example embodiment of the present invention, data is communicated between a home computer arrangement and a remote network access appliance in a manner commensurate with application and/or display characteristics of the remote appliance using a plug-in associated with the application creating the data. An agent (e.g., programming code) is implemented at the home computer arrangement and works with a network-based routing server to facilitate network-distributed routing control. Program applications (e.g., third party desktop applications) at the home computer arrangement are integrated for use with the agent using agent-specific programming, with the plug-in facilitating access to the data as characterized by metadata associated with the application. Such metadata includes, for example, data describing the application-specific data, such as that used to group the data, identify the data as a particular type of data, or set attributes for the data. Attributes may include, for example, display characteristics, playback characteristics, security characteristics or media rights characteristics, where appropriate. The plug-in is implemented, for example, using a dynamically loaded library of compiled code that provides additional and/or optional functionality; this functionality permits the agent to interact with and/or access the application-specific data.

In one application, the above-discussed agent implements a collection of modules dynamically loaded at runtime, the modules generally including one or more asset space plug-ins and MIME handler plug-ins. The asset space plug-ins act as an abstraction layer between the agent and some form of external resource (e.g., asset) storage, in facilitating access to stored assets in the context of characteristics of those assets (e.g., identifying information such as tags assigned by a program application by which the asset was created). Such assets may involve, for example, selected assets as implemented with a particular display (e.g., web page) being created for use at a remote network access appliance, such as images, audio, video, text or other data. These assets are generally stored in a location that can be referred to as asset space; to this extent, asset space as discussed herein may be implemented using one or more of a variety of types of storage locations, at a home computer arrangement or elsewhere and accessible via a network.

One of the asset-space plug-ins presents an interface to the agent to provide functions for querying, retrieving collections of assets, retrieving individual assets, and inserting new assets into the asset space. That is, the remote network access appliance, via an asset space plug-in, can interface with one or more assets (e.g., application program functions, data or other information) as facilitated by the network-based routing server without necessarily implementing asset-specific programming at the remote network access appliance. For instance, where an application program assigns tags to data identifying characteristics of the data such as a grouping, data type, date or other characteristics, the asset space plug-in is adapted to access these tags to present the information for use by the remote network access appliance in accessing or otherwise processing the tagged data. The tags may, for example, be specific to the application program or specific to a particular type of data (e.g., image data) which can be used by different application programs.

One or more of a variety of asset space plug-ins are implemented in connection with this approach, depending upon the particular situation. Examples of asset space plug-ins that can be implemented in connection with the various example embodiments discussed herein include those adapted to interact with a native file system, audio systems, video systems, email systems or network-connected devices.

In some applications, asset space plug-ins are implemented in non-physical form and may involve one or more combined asset spaces. For instance, where a particular asset space is defined logically (e.g., as a particular "logical asset space"), that asset space is selectively associated with one or more different physical asset spaces, with information in each physical asset space displayed as part of the logical asset space. As discussed above, one or more asset space locations can thus be implemented with a single logical asset space.

Certain applications involve the implementation of a dynamic asset space that changes according to selected criteria. For example, asset space plug-ins can provide an interface between a remote network access appliance and logical entities such as a desktop search engine, a user managed meta asset space consisting of pointers to favorite items in other asset spaces, playlists and other integrated meta data stored with the files. Where a logical asset space is defined as a function of a desktop application search function, stored files are searched for those files that match selected criteria. Results of that search, which may include information from varied locations, are defined as belonging to a particular logical asset space that meets the selected criteria at the time that the logical asset space is accessed.

As with the asset space plug-ins, one or more of a variety of MIME handler plug-ins are selectively implemented to provide services for transcoding assets of a specific MIME type into a format appropriate for the remote network access appliance. In this regard, when information regarding the type or types of applications and/or functions available at the remote network access appliance are ascertained, one or more MIME handler plug-ins are implemented to transcode assets into a format amenable for use by the remote network access appliance. In one implementation, a MIME handler is registered with an image/jpeg MIME type to appropriately transcode (adjust height, width, and quality) a JPEG asset to allow proper display on a remote network access appliance such as a mobile phone. In another implementation, a MIME handler is registered with an application MIME type to provide a rasterized version of a source file to be transferred to the remote network access appliance if the remote network access does not support viewing of documents of the source file type.

In some applications, application MIME types are implemented for rasterization of Adobe PDF-type documents, Microsoft Word documents or others. In this context, rasterization generally refers to converting images into raster (e.g., bitmap) form for display or other use. For instance, where PDF-type documents are rasterized, they may be converted from a PDF format into a bitmap format that is viewable on an Internet web browser application at a remote network appliance. In this instance, the remote network appliance does not necessarily need to implement a program application capable of viewing PDF documents; a web browser capable of viewing rasterized images can be implemented to view the rasterized PDF documents.

In another implementation involving asset space, multiple asset spaces are merged on the same or across multiple machines and/or devices, facilitating a unified intuitive user interface. Information from two or more asset spaces that relate to the same piece of data are combined, thus facilitating unified access thereto. In the context of providing access to a remote network access appliance, a user at such an appliance can access information from the two or more asset spaces using a single user interface. For example, where a particular display is configured for a user at a remote network access appliance, the display may draw information from two or more asset spaces relating to the data being displayed. One such implementation involves the display of images and audio data available at a home computer and accessible at a remote Internet access appliance via the agent. A display at the remote Internet access appliance is configured to show both the image data and the audio data, which may be stored separately (unrelated) but combined into a single asset space as presented to a remote user. When one or both of the image and audio data are selected for access, the image and/or audio data is configured for use at and routing to the remote Internet access appliance.

In some applications, asset space is shared among two or more users. This approach is useful, for example, where a user wishes shares his or her asset space with another user, and can facilitate that sharing via the provision of information to the other user via access control such as an electronic token (discussed further below). Certain applications involve the combination of different users' asset spaces into single or multiple (e.g., logical) asset spaces, facilitating access to content in both users' asset spaces via each combined asset space. Access to the combined asset space is selectively granted to users, including one or more of those users whose asset spaces are combined and/or other users granted by users whose content is available via the combined asset space. With these approaches, the host server works with one or more base network nodes to share asset space with different users and/or to combine asset space from different base network nodes and, where appropriate, present a single combined (logical) asset space to accessing users.

In another implementation involving asset space, metadata or other associated information is used to populate one or more asset spaces when a file or piece of media is delivered to a storage node from a remote network access appliance. For example, images taken with a mobile telephone having a camera implemented therewith can be routed from the mobile telephone to a home computer. The mobile telephone may, in connection with the transfer of images, add GPS data or voice tags to place into the asset space. With this approach, data can be added (e.g., tagged) to a particular file or piece of media. Furthermore, access to both the file/media and the data added thereto can be merged, as discussed in the previous example, such that access to the data (e.g., an image) is coordinated with access to voice, GPS or other data associated therewith.

Turning now to the figures, FIG. 1 is a system 100 for configuring and routing data via an internet protocol network using a server-hosted interface, according to another example embodiment of the present invention. The system 100 includes a network-based server 110 that hosts the interface, a plurality of remote network access appliances 120-$i$ and a plurality of home nodes 130-N (e.g., base network appliances), all of which communicate via a network 105. The network 105 includes an internet protocol-based network such as the Internet and, where appropriate, one or more other networks such as a mobile telephone network or a local area network (LAN). In some applications, the network 105 is a local area network implemented for a locality such as a home or business. In other applications, the network 105 is or includes a virtual network or set of virtual application communication channels within a processor or group of processors associated with a computing appliance.

The network-based server 110 includes a host application router 112 that interacts with user application routers at each home node and hosts the interface, e.g., as an Internet web page. In this regard, each home node includes such a user application router, with home node 130 shown including a user application router 132. The user and host application routers work together to make up a network-distributed router, the host application router 112 operating personal network-distributed routers for each user, such that each user's personal router (e.g., each user's personal network) includes that user's application(s) at the user's home node(s) operating together with the host application router 112. In some applications, the user application router 132 is configured at the network-based server 110 and downloaded to home nodes as a software download, and implemented on an appliance such as a personal computer or a network router. Each user can thus access his/her data at the user's home node or nodes, using his/her personal router and data at the user's home node(s).

Using the interface, the network-based server 110 selectively facilitates user access to data at one or more of the home nodes 130-N, via one of the remote network access appliances 120-i. The network-based server 110 implements authorization criteria 114 for authenticating a particular user in response to a request for access to data via one of the home nodes 130-N or one of the remote network access appliances 120-i. In this regard, when a user at a remote network access appliance requests data such as image, audio and/or video media content from a particular home node, the network-based server 110 processes an authorization for the request by the user using the authorization criteria 114. If the authorization is successful (e.g., authorization criteria are met), the network-based server 110 facilitates the communication of data from one or more of the home nodes 130-N to one of the remote network access appliances 120-i to which the user requested data.

The data communicated to one of the remote network access appliances 120-i is selectively configured at the direction of the network-based server 110 for use at the remote network access appliance. For example, where requested data from home node 130 is application-specific data that is implemented using a particular application program, the network-based server 110 controls, via one or both of the host application router 112 and the U.A.R. 132, the configuration of the data into a format that is usable by a requesting remote network access appliance (e.g., 120). That is, where the remote network access appliance 120 has an application program capable of implementing the requested data (e.g., by displaying or otherwise presenting data to a user), the requested data is not necessarily configured into a different format. Where the remote network access appliance is incapable of implementing the requested data, or where transfer of the data in a different format is desirable (e.g., to reduce transfer bandwidth), the requested data is reconfigured into a format such that it can be implemented at the remote network access appliance. For instance, where the requested data requires a particular word processing program and the remote network access appliance is to view the data using a web browser, one or both of the host application router 112 and the U.A.R. 132 work to configure the requested data into a format that can be implemented by a web browser.

In some applications, the configuration of data is implemented using a plug-in at the home node that is adapted to access information tagged to stored data in order to present the data to a remote network access appliance. A user at the remote network access appliance can thus make selections for data transfer in accordance with the tagged data (e.g., by requesting a particular category of data). The plug-in then uses the selection and facilitates the transfer of the requested data. Where appropriate, a MIME handler plug-in is implemented to transcode the requested data into a MIME type that can be implemented by the remote network access appliance via which the request has been made. These plug-in approaches may, for example, be implemented in a manner similar to that discussed in connection with FIG. 2A and others below.

The network-based server 110 also stores and uses configuration data 116 that includes a variety of configuration information used by the host application router 112 to facilitate the transfer of data on behalf of a user. The configuration data 116 is generally provided by users and further augmented by the network-based server 110 to include information useful in processing information on behalf of each user. The configuration data 116 may also include information from one or more service providers associated with users of the system, with the configuration data including, for example, global and/or specific policies related to each user's system use. Furthermore, the configuration data 116 is selectively implemented at one or more home nodes, and can be used for a variety of U.A.R. functions.

The configuration data 116 typically includes user preferences relating to a variety of user-specific functions, such as the type of interface presented to each user, the manner in which to present and/or deliver available content, accessibility limitations (e.g., to associated users) and data transfer characteristics. For instance, where a user prefers the delivery of a particular format of data to his/her remote network access appliance, or where capabilities of the appliance require a particular format, that user may specify the format in user preferences. The host application router 112 and/or the U.A.R. 132 accordingly works to format the data appropriately before sending the data to the user's remote network access appliance. Similarly, where the remote network access appliance is limited in application to a particular format, data sent to the remote network access appliance is configured into such a particular format. In addition, where appropriate, the host application router 112 and/or the U.A.R. 132 access requesting remote network access appliances to determine a usable data format type and format the requested data appropriately. In certain applications, data requests from remote network access appliances include such formatting information, with the host application router 112 and/or U.A.R. 132 implementing the formatting information in the request. These approaches may involve implementing the user application router at the user's home node for formatting the data and/or formatting the data at the network-based server 110 (e.g., as used with an agent application 250 shown in FIG. 2 and discussed below).

The configuration data 116 further includes information used by the network-based server 110 to communicate with and/or access each user's home node, such as the home node's address relative to the network 105 (e.g., each user's IP address and/or name space address) and security information. Where a user has more than one home node, such as with a household "user" having different computers used by different household members, or wherein different "home" nodes are located at different places on a network, the configuration data 116 reflects these multiple home nodes. User access with multiple home nodes in a household typically involves the network-based server providing an interface for, and access to, multiple computers to individuals associated with the household or business (and having the corresponding authorization). User access with multiple home nodes across a network wherein, for example, a user has different home node locations such as different places of residence and/or business, similarly involves the provision of access to multiple computers at different locations on a network, with a portion of a routing controller implemented at each location.

One particular user access approach involving multiple "home" nodes involves user access to multiple network-based home nodes from which the user is authorized to access data. For example, where a user at the remote network access appliance 120 purchases data such as a movie, music or software, a content provider having multiple home source nodes at which the data or media is located can grant the user access to these multiple nodes for downloading the purchased data. In this regard, a user can download data for a single purchase from multiple sources, thus speeding up the delivery of data. This approach may also involve the use of different home nodes implemented by users subscribing to a particular service, with each user making data available at his or her home node for subsequent transfer to an end user at a remote network access appliance. In these instances, the host application router 112 works with user application routers at each involved home node to manage the data transfer.

In some applications, the network-based server 110 grants access to information at multiple home nodes to a particular user, based upon the above-discussed authorization. For example, users may have more than one home node, such as two or more computers on a home or business network, or two or more computers on separate networks. The network-based server 110 works with user application routers at each home node to make content available the user, when the user is so authorized. Where used to show available data, the interface is configured to display data from all home nodes to which a particular user is authorized access.

Depending upon the particular application and type of data being transferred, the network-based server 110 tracks the transfer of data between the home nodes 130-N and the remote network access appliances 120-*i*. Where data having associated media rights (e.g., copyright) is transferred, the network-based server 110 tracks the transfer of the data to ensure that regulations associated with particular media rights are followed. For instance, where purchased music is transferred, rights associated with the music may limit the distribution of the music to users other than the purchaser. In this regard, the network-based server 110 tracks any transfer of purchased music to ensure that applicable regulations are met.

The system 100 is adapted to work in a variety of environments involving disparate networks, home node devices, remote network access appliances, data and characteristics thereof. One particular use-case scenario involves remote data access as follows. When a particular user who is party to the home node 130 (e.g., a homeowner having media content stored at his or her home computer) wishes to establish remote access, the user signs up for a service provided via the network-based server 110. The network-based server 110 prompts the user for access information to the user's home node 130 so that the host application router 112 can interact with the user's home node. This access information includes sufficient information for identifying the home node 130 on the network 105 and other appropriate information, such as data locations at the home node 130 that are accessible by the network-based server (and/or by remote network access appliances). The access information is stored with the configuration data 116, together with other information for the user as appropriate for the particular implementation.

The user application router 132 (software implemented, e.g., on the user's home computer, router or other network appliance) is installed at the user's home node 130 and is configured for operation in connection with the host application router 112. In some instances, some of the functions discussed as carried out with the host application router 112 are established and/or implemented at the user application router 132, such as the limiting of access to particular data locations at the home node 130.

An account is established for the user, with service type information (e.g., billing information) at the network-based server 110. The account includes authorization information established with the user, which is presented to the user for use in accessing the network-based server and, accordingly, his/her home node 130 as well as account information via the network-based server. This authorization information is stored with authorization criteria 114.

The user employs the remote network access appliance 120 for accessing data at the home node 130 by visiting the interface (e.g., web browser) presented by the network-based server on behalf of the user. In some applications, a user application router type function is also implemented at the remote network access appliance 120. This data access may involve, for example, the use of an Internet-capable mobile telephone as the remote network access appliance 120, with the interface being accessed as a web page via the mobile telephone. The user provides authorization information to the network-based server 110 via the interface. The authorization information may involve one or both of user-input authorization information (e.g., a password or voice for voice recognition) and identification information associated with the remote network access appliance 120. The network-based server 110 uses the authorization information together with the authorization criteria 114 to determine whether access is authorized.

Once the user has been authorized via the remote network access appliance 120, the network-based server provides the user with information regarding available data such as media content via the interface, viewed as a web page. One or both of the home node 130 and the network-based server 110 provide some of or the entire interface and a listing of available data for transfer. The listing of data may be tailored to a particular user's preferences, device capabilities, or otherwise limited in scope to restrict the data to which a particular user has access. The user selects data for transfer and the host application router 112 responds by interacting with the home application router 132 to facilitate the transfer of data to the remote network access appliance 120. This data transfer is carried out in accordance with the user's selection and the configuration data 116.

Where the selected data requires formatting, such as where the user's remote network access appliance 120 desirably receives data in a particular format as discussed above, the host and user application routers 112 and 132 work to format the data using, for example, the information stored at a home node and functionality of the remote network access appliance. For instance, where data is music and wherein the remote network access appliance 120 desirably plays music in a first format but the music is stored at the home node 130 in a second format, the music data is formatted into the first format prior to transfer to the remote network access appliance. The formatting is generally carried out at one or both of the home node 130 and the network-based server 110, depending upon the particular application. In some applications, the user application router 132 formats the data, prior to transfer to the remote network access appliance 120. The data is then transferred from the home node 130 to the remote network access appliance 120, via the network-based server 110 and/or directly via the network 105.

In some applications, the formatting involves the implementation of metadata, where available, associated with an application at the home node 130 to categorize or otherwise present the data to the remote network access appliance 120. For example, where a user requests a list of data falling under a particular identification type, such as all image data (e.g., a photo album), metadata that describes the data as image data is used to identify the data. The identified data is presented in a format amenable to display at the remote network access appliance 120. In some applications, the displayed data is identification data, from which a user can select specific data for actual transfer of content (e.g., images) corresponding to the identification data. The selection is communicated to the home node 130, which responds by configuring the selected data for use at the remote network access appliance 120 and facilitates the communication thereof.

The type of format in which data is desirably received at a particular remote network access appliance is set in one or more of a variety of manners. In one application, the configuration data 116 includes information regarding the format of data for a particular network access appliance as described above; when a user requests data for that particular appliance, the network-based server 110 works with the home node to set the data in the format indicated in the configuration data. In another application, users manually select a data format when requesting data via a remote network access appliance. In other applications, the data format is automatically selected by one or both of the network-based server 110 and the home node to which access is requested, using information identifying the type and/or abilities of the network access appliance to which the data is to be transferred (e.g., as included in the request communication therefrom).

Referring again to the above scenario, another data transfer approach involves the delivery of streaming data to the remote network access appliance 120 via the network-based server 110. Streaming data may involve, for example, the passage of data from a streaming data appliance, such as a television tuner, a video camera or a radio receiver, or the streaming of data from a network-based streaming source, such as an Internet radio station or other live broadcast source, or from a network-based video source. This streaming of data may also involve the application of subscription services or other fee-based use authorization that is implemented in connection with the data transfer and is applicable, for example, on a user-specific basis.

The host and user application routers 112 and 132 work to configure the streaming data in a proper format and, further, to transfer the data at a desirable transfer rate, relative to available bandwidth. The transfer rate may, for example, be relative to the condition of the network 105 and may further be characterized by transfer-related characteristics such as quality of network connection and associated functions, such as buffer size and approach. Further, the format is optionally carried out as a condition of the network 105 and/or the remote network access appliance 120, as relative to available transfer rate and/or as relative to the type of data amenable for use at the remote network access appliance. For instance, where a user requests streaming music from the home node 130, the available transfer rate is used to select the format of the music. Where available transfer rate is low such as with a mobile telephone network, lower bit rate data is used to reduce the amount of data required to be transferred for the selected music (and, accordingly, also resulting in relatively lower quality audio). Where available transfer rate is high, such as with a high-speed Internet link such as a DSL link, high bit rate data is used, facilitating high-quality music listening.

In some streaming applications, streaming data is protected or otherwise controlled using one or more of a variety of approaches to comply, e.g., with rights associated with the data or other applicable rights, such as those implemented by government agencies in association with the delivery of data. For example, where streaming media is protected by media rights, the application router uses protection to ensure that the transfer adheres to associated media rights. A variety of protection approaches, such as those discussed below, are implemented in accordance with the particular application and data use characteristics of the particular remote access appliance that will be using the data.

Where streaming data is subject to government type rules, such as those associated with the rebroadcast of a television or radio broadcast or rules, the application router transfers the data (or prevents the transfer of data) in connection with the rules. For instance, where the rebroadcast of a television broadcast is not permitted, the application router transfers data to ensure that any user receiving the broadcast is doing so without introducing issues relating to the rebroadcast such as by ensuring that an end user receiving the broadcast is entitled to do so as an original broadcast. Such rebroadcast may be facilitated in accordance with, e.g., conventional transfer of broadcast data to a remote television in one's own home.

In some applications involving the transfer of streaming data such as television data, the application router ensures compliance with blackout rules associated with a location in which the remote network access appliance exists. For example, where the broadcast of a particular streaming television signal is subject to blackout rules, such that the signal is not to be broadcast in a certain geographical region, the application router determines the location of the remote network access appliance before facilitating the transfer of the streaming data. Where the location of the remote network access appliance is in compliance with blackout rules, the application router enables the transfer of streaming data, and where the location is not in compliance with blackout rules, the application router disables the transfer of streaming data.

In one application involving a mobile telephone as a remote network access appliance, the application router identifies the location of the mobile telephone before enabling the transfer of data such as streaming data subject to blackout rules or other localization information. This identification may be facilitated using, for example, the identification of a local transmission location (e.g., a transmission tower or GPS) via which the mobile telephone communicates. When the location of the mobile telephone is determined, that location is used to determine whether the transfer of streaming data is appropriate, and the transfer is carried out (or not carried out) appropriately.

In another example embodiment, the network-based server 110 facilitates the transfer of data from one of the remote network access appliances 120-$i$ to one of the home nodes 130-N, using an authorization approach similar to that discussed above. For example, when a user at the remote network access appliance 120 wishes to send an image to his/her home node 130, that user accesses the interface provided via the network-based server 110. Once authorized, the user uploads the image to the home node 130, which responds by accepting the image and storing the image locally. With this approach, image storage is facilitated with the remote network access appliance 120 while utilizing the data storage capabilities of the home node 130. When implemented with a camera device, the remote network access appliance 120 enjoys a large quantity of storage space for pictures relative, e.g., to conventional cameras (and camera phones) where space is limited to storage at the camera. Further, when images are uploaded to the home node 130, adverse conditions such as lost or stolen cameras or camera phones do not necessarily suffer an associated loss of image data, relative to conventional approaches where images are stored at the camera or camera phone.

Some applications involving the selective transfer of data use a token or other deliverable authentication data to authenticate or otherwise enable a user to access and, where appropriate, use data. The token generally includes authorization information that is sent to a user at a remote network access appliance. For example, an electronic token may include a link to a particular web page hosted by the network-based server 110, with security type information embedded in the token for use in granting access to data stored at a home node. In addition, the token may also include information that can be used to link an end user with data, such as an identification of a storage location for the data. Furthermore, the token may include information specifying the type of data that can be used at a node from which a request for the data is made.

The token is generated using one or both of the host application router 112 and a user application router (e.g., 132) at the home node from which data is transferred. In some applications, a user accessing his or her home node via a remote network access appliance causes the home node and/or the host application router 112 to generate the token. A home node user then sends the token, such as via email, to an end user at a remote network access appliance. In some applications, the home node and end users may be the same person, for example where a particular user wishes to access his or her own data at a home node, when using a remote network access appliance.

A user at a remote network access appliance receiving such a token uses the token in one or more of a variety of ways to communicate with the network-based server 110 and ultimately to facilitate the transfer of data from a particular home node to which the token applies. In some applications, the end user implements the token directly, e.g., by clicking on a link associated with the token as sent in an electronic communication such as an email or instant message, or otherwise sending information associated with the token to the network-based server 110. Certain applications also require an end user to supply a password or other security criteria when implementing the token.

In some contexts, the token is implemented with a transmission report. That is, where a particular user at a remote network access appliance receives a token, that user sends a transmission report (e.g., by clicking on a link provided with the token) that is sent back to the network router. The network router (implemented at one or both of the host application router 112 and the user application router 132) in turn sends authentication and/or security information to the user at the remote network access appliance to make transferred data usable thereat. This approach may be implemented, for example, where the token includes a link to the data, where the token includes the data or where the token is delivered along with the data.

Certain implementations involve the use of tokens having a lifetime, with the tokens usable more than once. For instance, where a token provides access to a particular media file or files, a user holding the token at his or her network access appliance can access the particular media file or files throughout the lifetime of the token. In addition, when updates are made to the media file or files to which the token applies, notification can be sent to a user holding the token. For example, where a token grants access to a file including a personal digital photo album shared by multiple family members, each having token access, updates to the photo album can be announced to the family members.

Another example embodiment is directed to the use of a token for promotional purposes, where user reaction to the token is tracked and used for promotions. For example, a token may include information enabling a user at a mobile telephone to access and download a ring tone that is a short music clip. If the user likes the ring tone and subsequently purchases music relating to the clip (or otherwise), information in the token is used to track that purchase. In some applications, a royalty (e.g., funds, service or other item of value) is given relative to the tracked purchase. The royalty may be facilitated, for example, by tracking the source of the token and giving that source a royalty based upon the purchase.

In another implementation, the network-based server 110 is configured for processing requests for data transfer in accordance with media rights associated with the data. Media (or other data) rights are often the subject of rules, regulations, contracts or other agreements relating to the rights associated with the data. In this regard, these rules, regulations, contracts or other agreements are implemented to ensure that any transfer of the data complies with these agreements. For instance, as discussed above, certain data such as media is protected by copyright or other digital rights management (DRM) protection. Where the transfer of the protected data needs to comply with particular rules or regulations, the network-based server 110 and corresponding home node are configured, via the host application router 112 and the user application router at the corresponding home node, to take steps to ensure the transfer of data is in compliance.

For example, where a user at the remote network access appliance 120 requests the delivery of protected data, the host application router 112 works with the user application router 132 to process and transfer the requested data accordingly. In some applications, this transfer involves simply passing protected data to the remote network access appliance 120, which processes the data with protection for use. In applications where the remote network access appliance 120 cannot process data in a particular protected format or where the passage of protected data is undesirable, the application router configures the data into a protected or unprotected format that can be used by the remote network access appliance.

In some applications, the network-based server 110 blocks access to certain files relative to the type of file and applicable regulations regarding the transfer of the type of file. For example, access to protected media may be blocked to any user other than a user verified as being the owner of the protected media, e.g., where a user at home node 130 makes data available to his or her personal remote network access appliance 120.

In certain implementations, the network-based server 110 tracks the transfer of protected data and, where appropriate, reports irregularities or potential abuses. For instance, where a password for controlling user-specific access to protected media is used by more than one user at a time, or used at a relatively high frequency, the network-based server 110 can detect these uses and flag the use as potentially in violation of relevant media rights. Such an approach addresses the potential of users illegally sharing their information with others. Relative to the token approach discussed above, the frequency and timing of token use and/or an identification of appliances using the tokens, can be similarly tracked and used to identify any irregularities. In some implementations, a user's account is automatically shut down, effectively stopping any transfer of data, upon detection of a potential irregularity.

Data (e.g., media) rights are protected in a variety of manners. In some implementations, encryption, password protection or forward-blocking approaches (i.e., preventing received data from being re-forwarded) are used to ensure that protected content is transferred in compliance with applicable rules. These approaches may be implemented in connection with the original protection applied to data or with re-protection, where the application router removes the original protection and re-protects the data for delivery to a remote network access appliance.

For certain applications requiring the delivery of data in accordance with particular protection approaches, such as those implemented with relevant communication rules and/or laws, the host and user application routers 112 and 132 use some or all of these approaches to ensure compliance. In some applications, the application router removes the original protection from data and sends the data in an unprotected format to a remote user, where such unprotected delivery is acceptable (e.g., where delivery to a particular user's remote network access appliance is in compliance with applicable rules). In other applications, the application router re-protects the data in a manner such that the data can be processed by the remote network access appliance. Still other applications involve the use of a token as discussed above, with the token including, for example, authorization for a particular user to receive and use data, or application software that facilitates the use of protected data at a remote network access appliance.

In another example embodiment, the application router implemented with the host application router 112 and a user application router (e.g., 132) is configured to select a particular communications medium in the network 105 to use in sending data to a remote network access appliance. For example, certain remote network access appliances are capable of connecting to different networks (e.g., implemented as represented by the network 105). Mobile telephones are one example type of remote network access appliance that can be used in connection with such an approach, where a particular telephone may be capable of receiving data over different communications links (e.g., via a GSM (global system for mobile communications) link, a CDMA (code division multiple access) link or a local wireless internet link). In this regard, where multiple networks are available and where a particular network access appliance to which data is to be transferred is capable of receiving information via the multiple networks, the application router selects one of the networks via which to send data.

One application involving the above-mentioned approach to communications medium selection involves the use of a mobile telephone or other device configured to communicate via both a mobile telephone network such as a GSM network and a local wireless internet link (e.g., commonly referred to as "wi-fi"). Where a mobile telephone network is available (as typically readily available for telephony communications), telephone and/or data communications can be sent via the mobile telephone network. Where a wireless internet network link is available, data communications can be selectively sent via the wireless internet network link, generally facilitating higher data transfer rates than mobile telephone links and, in many instances, relatively more economical data transfer. The wireless internet link is also used for telephony communications, e.g., where the mobile telephone is configured for internet protocol (IP) telephony type communications.

The combination wireless internet/mobile telephone capable phone can be used in a multitude of manners, depending upon the particular application, available networks, user configuration and service provider conditions. For instance, when such a mobile telephone is used in an area offering no wireless internet link, or where any wireless internet link is not robustly available, the mobile telephone network is used for data and voice communications. Conditions relating wireless internet availability may be detected, for example, by the telephone itself or by the network-based server 110, e.g., by using information associated with an identified mobile telephone communications source such as a transmission tower. When the mobile telephone has access to a wireless internet link, the link is used for communicating data and, in particular, for communicating data having a relatively large size (and thus benefiting from high bandwidth communications and potential lower cost communications channels). Such wireless links are typically available, for example, in airports, coffee shops, educational institutions or other locations where a wireless internet link is desirable; furthermore, as wireless internet technology grows, these links are becoming more widespread and are implemented publicly in a variety of regional locations.

In some applications, configuration settings in the mobile telephone, at the network-distributed application router or at other nodes in the system 100 are set to control the delivery of data to the mobile telephone as a function of the availability of a wireless network. For example, where a user requests data such as a movie or a presentation having a relatively large data file size, settings at one or more locations in the system 100 may be configured to transfer the data when a wireless internet link is available to the mobile telephone. In this regard, user configuration may be implemented to make wireless internet transfer a desirable option for data files over a certain size, with an option to override the settings to effect transfer over a mobile telephone network. This approach may be useful, for example, where immediate data transfer is not necessary or where a user elects to wait to transfer data until a wireless internet link becomes available for economic or other reasons. In this regard, a user can request a particular set of data and the network-distributed application router (112 and/or 132) can be implemented to automatically transfer the requested data when a wireless internet link becomes available to the mobile telephone or when a user specifically initiates the transfer.

Another example embodiment relative to the use/selection of wireless internet networks and a mobile telephone network involves the transfer of data from a remote network access appliance (e.g., remote network access appliance 120 to home node 130 in FIG. 1). The transfer of data in this direction may be managed in a manner that is similar to the management of data transfer from the home node to a remote network access appliance. For example, where a video or picture(s) is taken with a mobile telephone, the file size associated with that video or picture(s) may be large. In this regard, the information can be selectively transferred to the home node relative to the availability of a wireless network. One such application involves the use of a camera phone; when a user has taken several pictures, those pictures can be uploaded to his or her home node when a wireless network is available. With this application, photos taken can be securely stored at a home node while freeing up space at the camera phone for taking additional pictures. Many other applications (e.g., video) are implemented in a similar manner.

Referring again to FIG. 1, the selection of a particular network over which to send data may involve the consideration of one or more of a variety of network characteristics, such as transfer rate, reliability, availability, rights protection, cost and others including, for example, those discussed above. Users employing the network-based server 110 for the transfer of data may also provide user-specific data regarding preferences for data transfer in the realm of multiple available types of networks. The preferences may be provided in the form of configuration data 116 that the application router can access and use in selecting a particular data transfer network or time, or may involve a selection by a user at a remote network access appliance made in connection with a particular data transfer event. These user preferences or selections may involve the direct selection of a particular network or, for example, the selection of criteria for use by the network router in selecting a network on behalf of a user. In this regard, the application router employs criteria in selecting a particular network via which to send data and, in some applications, in selecting a particular time during which to send the data.

In another example embodiment of the present invention, a smart cache 140 is implemented with the system 100 for storing (caching) data to be transferred over the network 105 to one or more of the remote network access appliances 120-*i*. The smart cache 140 is configured for storing data and accordingly involves devices such as a database system or other data storage arrangement accessible by the network-based server 110. The smart cache 140, while shown as a separate arrangement, can be selectively implemented with one or more of the devices/networks shown in the system 100, such as with the home node 130, the network 105, the network-based server 110 (or a different network-based server) or a remote network access appliance 120. In some applications, data in the smart cache 140 includes data belonging to a particular asset space and, where that asset space is accessed by a remote network access appliance, the data in the smart cache is made available.

When data is transferred between one or more of the home nodes 130-N and one or more of the remote network access appliances 120-*i*, the smart cache 140 can be implemented as a buffer and/or storage arrangement. For example, when a user at home node 130 wishes to make selected audio data (e.g., certain music) available to his or her mobile telephone or other remote network access appliance, that user can initiate data transfer, using the host application router 112 together with the user application router 132 to the smart cache 140. In addition, where data is to be configured for implementation at a remote network access appliance, the smart cache can be sued for storing data from the home node, with the host application router 112 facilitating the configuration of the stored data into a format amenable to the remote network access appliance, and subsequent transfer of the configured data. This data is then available for subsequent download and/or streaming to the user's remote device. In a reverse transfer application, data can be transferred from a remote network access appliance to the smart cache 140, regardless of availability of a particular home node to which the data is sent. Subsequently, the home node can access the smart cache 140 to retrieve the data. With these approaches, a home node or remote network access appliance need not necessarily be accessible to facilitate a transfer of data. Furthermore, where transfer of data involves the transfer of streaming data, the smart cache 140 can be implemented as a buffer to accommodate potential problems with communicating over one or more links in the network 105, or simply to pause the stream of data (e.g., to pause video and/or audio playback).

Another application of the smart cache 140 involves the cache implemented at a home node, such as in a personal computer or with a storage device at the home node 130. Generally, where a user application router 132 is active and the cache is active (or can be activated by the user application router 132), access to the cache is available to a remote network access appliance. In this regard, a user at an appliance such as a personal computer can transfer data to the smart cache 140. Once transferred, the personal computer or other appliance can be shut down while ensuring that the data is available in the cache for access. For example, where a network attached storage (NAS) device is implemented at the home node 130, a user at a PC at the home node can designate a particular file in the NAS to be available for data transfer. The NAS (or a file therein) acts together with the user application router 132 as the smart cache 140; access and data transfer are effected in a manner similar to those discussed herein.

In some applications, the user application router 132 administers the storage of data in the smart cache 140 using conditions relative to the particular type of data transfer scenario in which the smart cache 140 is implemented. Where use of the smart cache 140 is appropriate or otherwise beneficial, the user application router 132, possibly in connection with the host application router 112, facilitates that use by automatically managing transfer to and from the smart cache. In other applications, a user at a home node or remote network access appliance manually directs the storage and/or retrieval of data at the smart cache 140, such as by physically storing information at a local or remote data storage (cache) location. Depending upon user selections, certain data may be stored in the smart cache 140 based on a rule implemented with the user application router 132, such as for data a particular user needs to access on a regular basis or for data requiring a long time for transfer, such as video data.

In some applications, the network-distributed application router accesses the smart cache 140 using a protocol-based approach for retrieving data. For example, where a user at the remote network access appliance 120 requests data made available via the home node 130, the network-distributed application router ascertains whether the requested data is available in the smart cache 140. If the data is available at the smart cache 140, the data is transferred to the remote network access appliance 120. If the data is not available at the smart cache 140, the network-distributed application routing controller accesses the home node 130 to retrieve the data.

When data is undergoing transfer to the smart cache 140, one or both of the user application router 132 and the host application router 112 monitor the data transfer and, where appropriate, communicates with the device making the transfer to ensure that the transfer is effected properly. For example, where a user elects to transfer data from his or her PC to the smart cache 140, the transfer is monitored to ensure that it is successful. For instance, if a user attempts to shut down his or her PC or otherwise interrupt the transfer, a warning communication (e.g., a pop-up message on a PC monitor) is generated to alert the user that the transfer has not been completed.

In another embodiment involving the smart cache 140, video is streamed to a remote network access appliance using the smart cache to store some or all of the video as a buffer. For example, where a user orders a movie, via a home node 130, to be downloaded for playback at a remote network access appliance 120, a selected amount of the video data for the movie can be stored at the smart cache 140. Once playback is started, data sent for playback is deleted from the cache 140 or otherwise made inaccessible, with remaining data for the movie being sent to the cache 140 or, in some instances, directly to the remote network access appliance 120. In some applications, the movie data stored at the smart cache 140 is unusable at the remote network access appliance (or any appliance) until an enabling stream of data, such as that involving encryption information or video data, is sent to the remote network access appliance. This enabling stream of data is used to make the movie data available at the remote network access appliance. With these approaches, movie data is transferred, with at least a portion of the movie data stored in the smart cache 140, while maintaining relevant media rights to the movie in that a usable copy of the movie is not necessarily stored at any location.

Other applications are directed to a token approach, similar to that discussed above, using the smart cache 140 to store information to which a token is directed. For example, where a user at a home node sends a token for use at a remote network access appliance for retrieving a particular set of data, the particular set of data can be stored in the smart cache 140. The token may, for example, point to the section of the smart cache 140 in which the data is stored. When a user at a remote network access appliance implements the token, the particular set of data at the smart cache is sent to the remote network access appliance.

The home node 130 and user application router 132 are implemented in a variety of manners, depending upon the application. In some applications, the user application router 132 is located at a home computing device such as a desktop or laptop computer. In other applications, the user application router 132 is programmed into a router, modem, data storage device or other user device implemented in a home, office or other (generally local) network system. Furthermore, the user application router 132 can be implemented with one of the remote network access appliances 120-*i* in certain applications. In this regard, FIG. 1A shows different example embodiments involving a user application router and a multitude of different data types and/or storage arrangements.

Figure 1A:
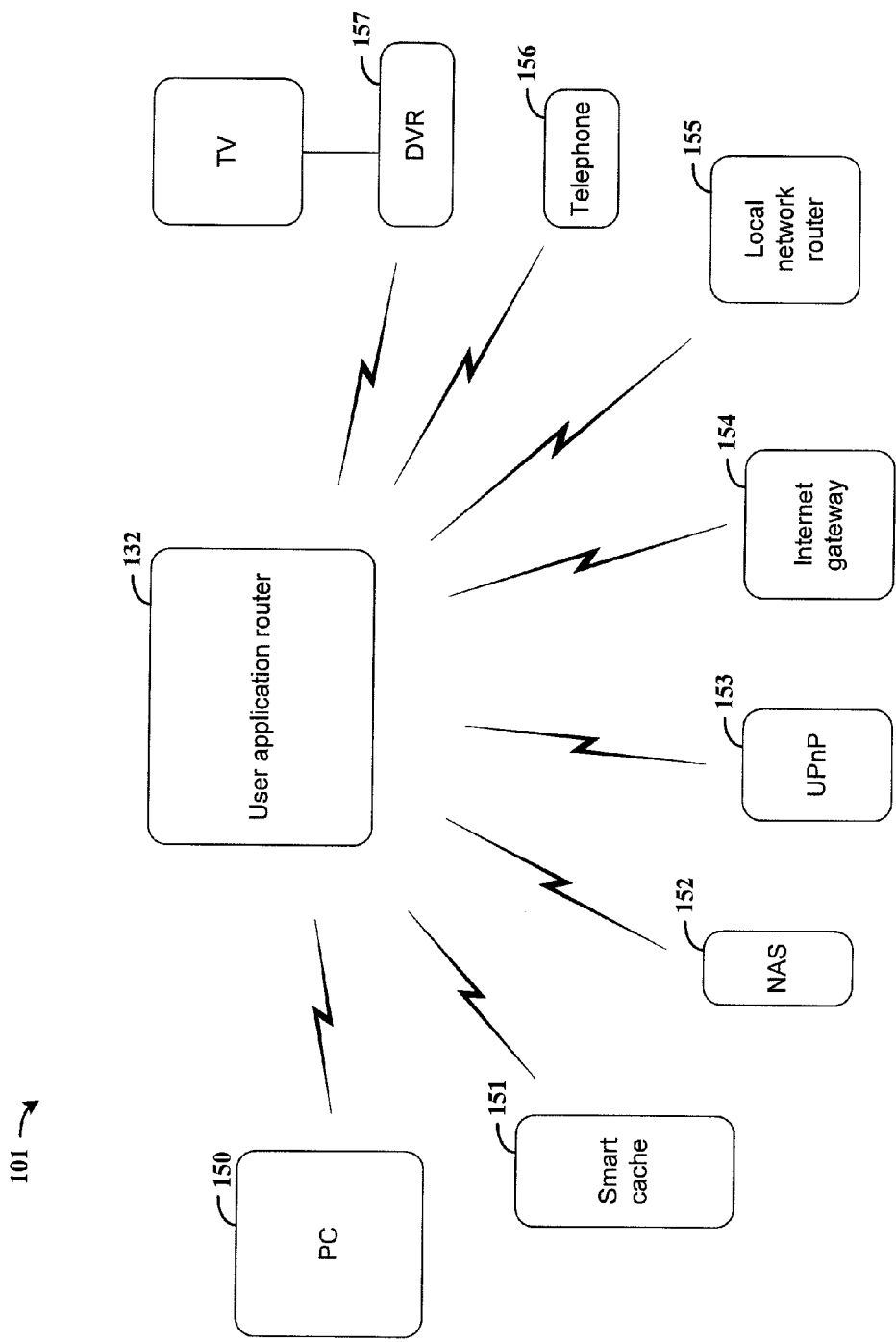
FIG. 1A shows a home network configuration involving a user application router implementation, according to another example embodiment of the present invention.

FIG. 1A shows a home network configuration 101 involving the user application router device 132, according to another example embodiment of the present invention. As discussed above, this configuration 101 may be implemented in connection with one or more of the home nodes 130 as described with FIG. 1, with some or all of the devices shown in FIG. 1A making up such a home node. The user application router 132 is shown as a separate device but may be implemented in connection with one or more of a variety of devices, including those shown. Shown by way of example are a personal computer 150, smart cache 151, network attached storage (NAS) device 152, universal plug and play (UPnP) device 153, internet gateway 154, local network router 155, telephone 156 (e.g., an IP telephone) and/or digital video recorder (DVR) 157 (or, e.g., a PVR. Some or all of these devices are connected on a home (or business) network with the user application router 132 controlling access to one or more thereof for file transfer or streaming data transfer with a remote network access appliance. Furthermore, the shown devices may communicate with one another, directly or via a router (e.g., the local network router 155), for transferring data and/or implementation user application router functions.

In some applications, data available from one or more of the items 150-157 is selectively configured and provided to a remote network access appliance using one or more of the approaches described herein. For example, where the DVR 157 includes video data stored for use by a particular DVR application, a plug-in for the DVR is selectively implemented to access content at the DVR in categories or other arrangements identified, for example, with metadata. The identified categories are provided to the remote network access appliance in a format amenable to browsing through the categories and selection of a particular video (e.g., asset) for playback. Selected video content is configured for playback at and communication to the remote network access appliance, using information characterizing available functions at the remote network access appliance. For instance, where the remote network access appliance has particular browser-based video playback capabilities, the video data is configured in a format amenable to playback in accordance with those capabilities.

In one implementation, the user application router 132 is integrated with the local network router 155, with functions of the user application router programmed into the local network router. In this regard, the individual devices shown in FIG. 1A need not necessarily be powered to facilitate data transfer with the home node represented in the configuration 101. For instance, where data stored on the NAS device 152 is desirably made available to the remote network access appliance 120 (of FIG. 1), the local network router 155 can directly control access thereto without necessarily involving the PC 150 (or other controlling device). Furthermore, where appropriate, the local network router 155 can be programmed, together with one or more of the devices shown, to power the device (e.g., wake the device from a low power sleep mode to an active awake mode) to facilitate data transfer therewith. These and other approaches are readily implemented with the user application router 132, whether integrated with the local network router 155 or with another device.

Figure 2A:
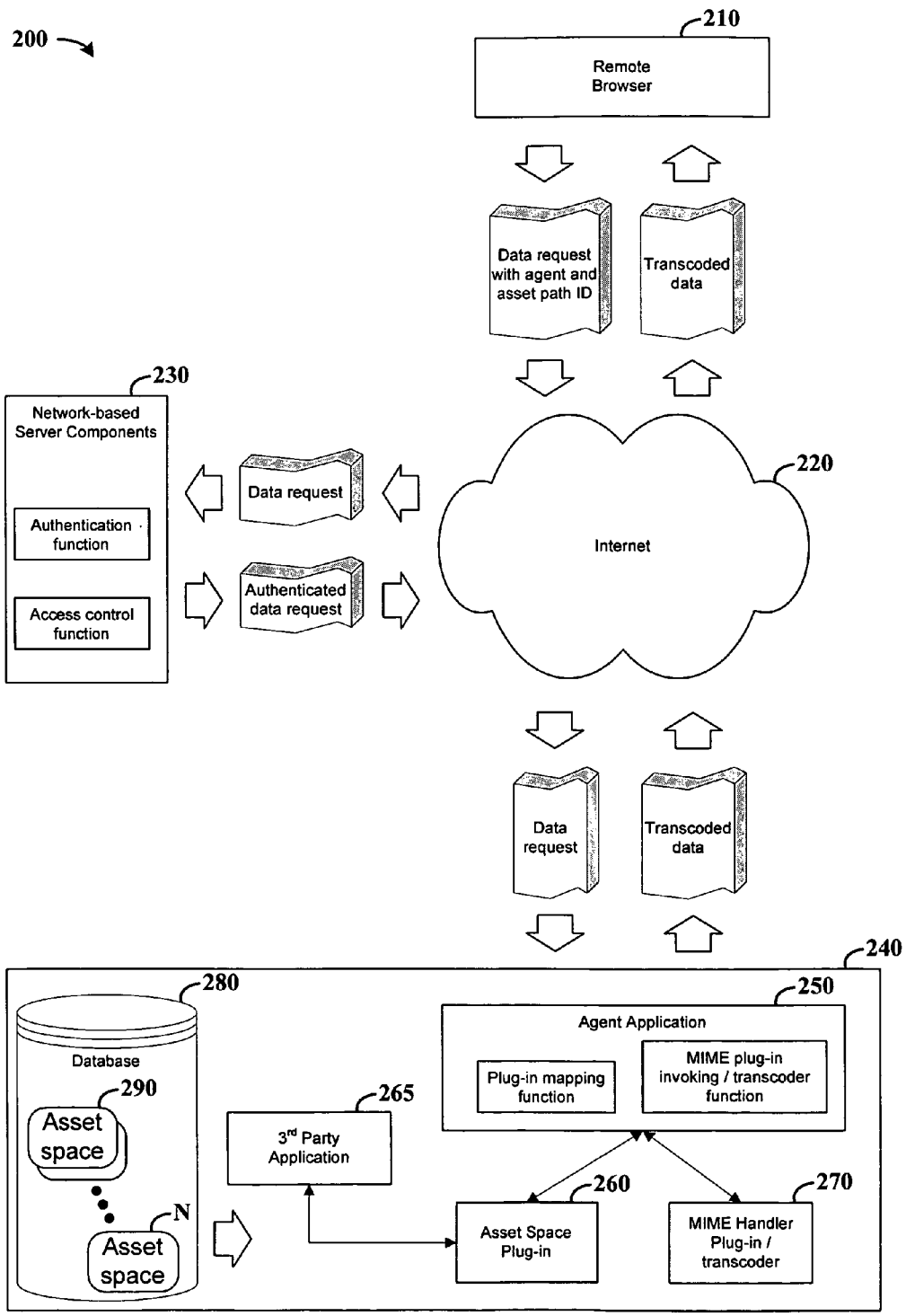
FIG. 2A is an arrangement and approach to the communication of data between a agent application and a remote user, according to another example embodiment of the present invention.

FIG. 2A shows a system 200 for data routing and configuration therewith, according to another example embodiment of the present invention. The system includes a plurality of remote browser applications including remote browser application 210, network-based server components 230 and a plurality of agent-based arrangements including agent-based arrangement 240 (e.g., a base node in the context of the above discussion). Generally, the remote browser application 210 is implemented in a remote access appliance such as a mobile telephone or computer. The agent-based arrangement 240 is implemented at a home node, such as at a user's home or business computer, server or other network-accessible appliance (e.g., a storage device or a media appliance such as an audio or video appliance). The network-based server components 230 are implemented in a host server, which interacts with both the remote browser application 210 and the agent-based arrangement 240 to facilitate the communication of data therebetween.

The agent-based arrangement 240 (e.g., a home computer) includes an agent application 250, an asset-space plug-in 260 (e.g., a plug-in tailored for one or more specific third party applications) and a MIME handler plug-in 270. The asset space plug-in 260 is implemented to access data characterized (e.g., via metadata) by a third party application 265 (or a plurality of such applications), such as a program application for text, audio and/or video processing. Data for which the asset space plug-in 260 is implemented may be available locally, such as in a database 280 or available remotely via the Internet 220, such as in a remote storage location or subscription-based content provider.

The database 280 may be implemented in more than one logical and/or physical location. For instance, the database 280 may include one or more of a local database, a distributed database, storage appliances such as a digital audio or digital video device, or another local network access device that is adapted to access a remote database service such as a content provider. These database implementations are coupled to communicate with the agent-based arrangement 240 using, for example, a local network communications link or the Internet.

A multitude of asset spaces 290-N, including physical and/or virtual asset spaces, can be implemented with the database 280 and, where applicable, with other remote data storage locations. These asset spaces 290-N are selectively integrated to form one virtual asset space, when viewed at the remote browser 210, and include data located in one or more of a variety of local and/or remote storage locations.

In some applications, the asset space plug-in 260 is adapted to identify and access data stored using different approaches.

For instance, the asset space plug-in 260 can access data stored in an individual file in the database 280. In addition, the asset space plug-in 260 can be implemented to access data stored in a particular location, such as a specified row or rows in the database 280.

The system 200 is implemented to facilitate the flow of data between the remote browser 210 and the agent-based arrangement 240 in one or more of a variety of manners. In one application, the flow of data is facilitated as follows. A user makes a URL (uniform resource locator) request from a mobile telephone implementing an HTML browser with the remote browser application 210. The URL request contains an identifier for the agent-based arrangement 240 and an asset path that identifies both an asset space and asset to be accessed with the request.

The user request is received by the network-based server components 230, which authenticate the request, apply access control rules to the request, and route the request to the appropriate agent-based arrangement. The network-based server components 230 implement the access control rules for controlling access to the agent-based arrangement 240, with access limited, for example, to an owner (e.g., of a home computer implementing the agent-based arrangement) or to a user granted access by the owner. In some applications, the access control rules specify the granting of access only to selected information (e.g., selected asset space) available at the agent-based arrangement 240. As discussed further herein, the granting of selected access can be effected using a token-type approach, where an owner/controller of the agent-based arrangement 240 issues a token to a user, who is granted access (when implementing the token) to the agent-based arrangement 240 in accordance with access control specified in the token. Furthermore, the network-based server components 230 implement access control rules similarly for granting access for uploading data to the agent-based arrangement 240, with access to individual users for uploading files to selected data locations (e.g., asset space) accordingly managed as specified in the access control rules for the particular user uploading the data.

Once the request is received by the agent-based arrangement 240, the asset or asset space defined in the request is mapped to an asset space plug-in 260 for handling, which accesses an asset or assets as a function of the request and of information characterizing the data (e.g., metadata). In some implementations, the asset space plug-in 260 interacts with any required external application (e.g., third party application 265) to handle the request, i.e., by associating the request with a particular application type that supports the type of data at the agent-based arrangement 240 that is the subject of the request.

Where the request is for data to be sent to the remote browser application 210, a response to the request is configured as a function of the MIME type of the asset returned from the asset space and the capabilities of the requesting remote browser application. An appropriate MIME handler plug-in 270 is invoked to transcode the response in a manner that is amenable to use at the remote browser application 210. Once transcoded, the response is returned to the remote browser application 210, either directly or via the network-based server components 230.

Where the request received by the agent-based arrangement is for uploading data, such a response may not necessarily be implemented, with data accompanying the upload request being loaded into the agent-based arrangement 240 and, where specified, into a particular asset space. Where specified by a user of the agent-based arrangement 240, if the data is not in a format amenable to an application implementing the data, the asset space plug-in 260 interacts with the MIME handler plug-in 270, and the data is transcoded into an appropriate format.

In another application, an initial user request (e.g., from a mobile telephone as discussed in the preceding paragraphs discussing FIG. 2A) is for an identification of available assets that can be accessed. The request may identify an asset space (e.g., a particular category of data), or may be general in requesting identification of all available assets. The network-based server components 230 authenticate the request, apply access control rules and route the request to the appropriate agent-based arrangement, which returns information identifying available assets, if any, as a function of the access control rules and the request itself. From there, the mobile telephone can send a second request that identifies specific assets to be returned, or a group of assets to be returned, from the list of available assets.

In connection with another example embodiment, the asset space plug-in 260 is integrated with the third party application 265. In this embodiment, the third party application 265 handles data requests by preparing information to return to the remote browser application 210, using information in the request (or otherwise available) detailing capabilities of the remote browser application 210. This prepared information is made available to the agent application 250, which implements the MIME handler plug-in 270 to further facilitate the request.

The MIME handler plug-in 270 selects an appropriate MIME handler to perform data transformation for any given HTTP request as a function of the source data MIME type and the destination data MIME type. In one implementation, the MIME handler plug-in 270 identifies the source MIME type from HTTP Content-Type header values and/or by directly examining the data. In another implementation, the MIME handler plug-in 270 derives the MIME type of a destination for the data using HTTP Accept header values of the data, in the case of transforming data to be returned as an HTTP response, and/or using the MIME type or types that a particular asset space is adapted to accept.

In some applications, each MIME handler is associated with a single canonical MIME type and a collection of output MIME types. The canonical MIME type defines the type of data that can be used as input to the handler. The MIME handler plug-in 270 uses the collection of output MIME types to determine the type of data that can be generated by the handler. When selecting a MIME handler to handle a HTTP request the MIME handler plug-in 270 iterates across all available MIME handlers in no particular order until an appropriate handler is found. If no suitable handler is found, the MIME handler plug-in 270 uses a default handler, which returns the source data unmodified.

When selecting a MIME handler, the MIME handler plug-in 270 deems a particular MIME handler appropriate when the source data type matches the canonical MIME type for the handler and the intersection between the output MIME types for the handler and the destination data MIME type is not an empty set. That is, when the output and destination MIME types include a matching MIME type, the MIME handler plug-in 270 is adapted to facilitate an appropriate transformation of data.

In one implementation, the MIME handler plug-in 270 transforms data with a MIME type that is a canonical type of text/xml, with a destination data set of {text/html, application/xhtml+xml}. The MIME handler plug-in 270 transforms XML into XHTML (and by definition HTML) using a transform mechanism. For instance, where an HTTP request is for data "foo.xml" is received by the MIME handler plug-in 270 with an Accept header of "text/html," the MIME handler plug-in tests for the source data type, text/XML, which matches the canonical MIME type. The intersection of the sets {text/html} and {text/html, application/xhtml+xml} is not an empty set; therefore the MIME handler plug-in 270 transforms the requested data ("foo.xml") from text/XML to text/html.

As discussed above, the asset space plug-in 260 and the MIME handler plug-in 270 can be implemented to facilitate the display and transfer of various types of data, associated with various programs, to the remote browser 210. In one embodiment, an image management application implemented as the third party application 265 at the agent-based arrangement 240 maintains an entry for each image it manages in the database 280 (e.g., associated with one or more of the asset spaces 290-N). The entries contain metadata pertaining to the image, and the location of the image within the file system.

The image management application 265 provides a mechanism for a user to add user-defined metadata to each entry. This user-defined metadata is selectively used to organize entries into logical collections, where a collection is defined as the set of entries that have the same value for some piece of metadata. For example, all entries with a "collection=people" metadata value are members of the "people" collection (i.e., including images of people).

The agent-based arrangement 240 provides an asset space abstraction to the image management application 265 through its plug-in capability, by accessing the metadata to identify particular data in the database 280 characterized as indicated in the metadata. A user at the remote browser 210 is thus able to remotely access images based on metadata maintained externally to the image. For instance, when the user at the remote browser 210 sends a data request with asset information specifying images of people, the asset space plug-in 260 accesses metadata in the database 280 to identify data corresponding to the "people" collection. The identified data is then transcoded via the MIME handler plug-in 270, if appropriate, and then sent to the remote browser 210.

In other applications, metadata as discussed above is selectively used to both select items from within an asset space as well as to use that metadata to drive the presentation of the items to the user. For instance, a mapping application running as the third party application 265 may store image data with geographical coordinates as metadata corresponding to the image data. Where a user requests an image of a geographic region, such as a particular city, the region is defined as a set of coordinates that are submitted to the agent-based arrangement 240. The request is processed using an asset space that is capable of extracting appropriate metadata from images on the file system, using coordinates of where the image was created. Using this metadata, the asset space is able to select images that fall within a user-defined geographic region. Once selected, the images can be placed into a map of the user defined geographic region in the location that the image was created (specified by the geographic metadata contained in the image).

In some applications, one or both of the network-based server components 230 and the agent-based arrangement 240 selectively deny requests from the remote browser application 210, where programming available at the remote browser application cannot process data or other information that is the subject of the requests. For example, where a particular request specifies a resource that includes video data that cannot be used at the remote browser application 210, the request for such data may be denied where the data cannot be transcoded appropriately for use at the remote browser application in some other fashion.

In certain applications, a request from the remote browser application 210 may be directed to a resource set that includes certain information that can be used at the remote browser application as well as other information that cannot be so used. In this regard, one or both of the network-based server components 230 and the agent-based arrangement 240 process requests from the remote browser application 210 by facilitating the selective return of information that can be used at the remote browser application. Certain information in the requested resource set may be directly usable at the remote browser application 210, in which case the above-discussed transcoding approach is not necessarily implemented. Where certain information in the requested resource set is usable at the remote browser application 210 in a transcoded form, that information is transcoded as discussed above. Information in the requested resource set that cannot be used at the remote browser application 210 is accordingly not sent thereto. With this approach, information returned to the remote browser application 210 includes as much information in the resource set as can be used at the remote browser application, with transcoding implemented and information restricted, as appropriate.

Figure 2B:
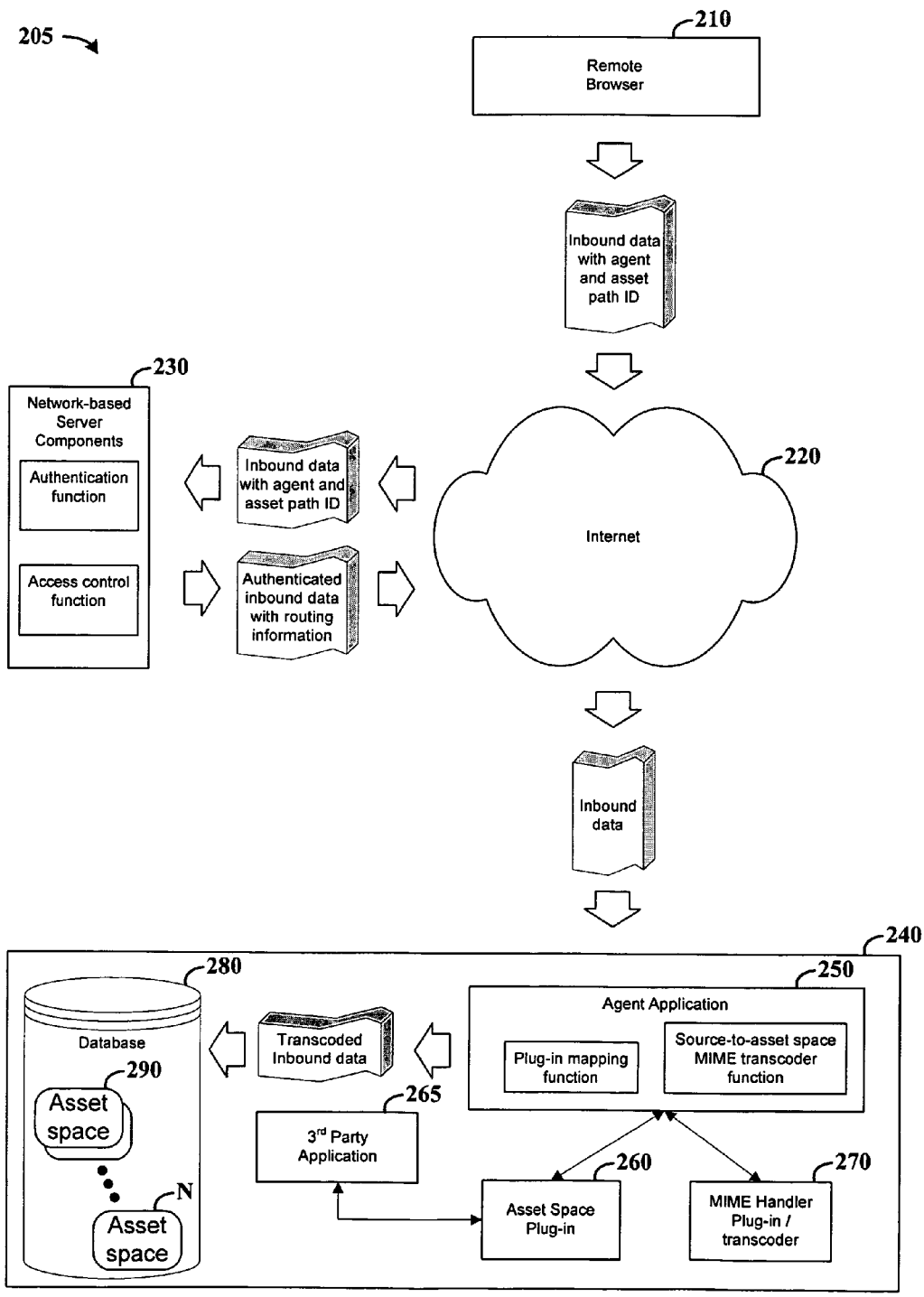
FIG. 2B is an arrangement and approach to the communication of data from a remote user to an agent application, according to another example embodiment of the present invention.

FIG. 2B is an arrangement and approach to the communication of data from a remote user to an agent application, according to another example embodiment of the present invention. The approach shown in FIG. 2B is applicable, for example, to the approach shown in FIG. 2A, with data being sent to the agent-based arrangement 240 from the remote browser application 210. Inbound data, such as image data, is sent from the remote browser application 210 to the network-based server components 230 via the Internet 220.

The network-based server components 230 implement an authentication function to authenticate the inbound data as appropriate for transfer to the agent-based arrangement 240 (e.g., to ensure that a user at the remote browser application 210 is authorized to transfer the data to the agent-based arrangement). An access control function is also implemented to assign routing information to the inbound data, which is in turn sent (using the routing information) to the agent-based arrangement 240 via the Internet.

Once data is received at the agent-based arrangement 240, the agent application 250 processes the data to determine whether it is in an appropriate data type for use in one of the asset spaces 290-N in the database 280. If in an appropriate data configuration/type, the inbound data is stored in a matching asset space in the database 280. In this context, storing the data in a matching asset space may involve, for example, storing the received data generally and further storing metadata that characterizes the received data for association with one or more (virtual) asset spaces. If not in an appropriate data configuration/type, the agent application 250 invokes a source-to-asset space MIME transcoder function that implements a MIME handler plug-in/transcoder 270 to transcode the data into data having an appropriate MIME type (e.g., as usable by a third party application 265, via an asset space plug-in 260). This transcoding approach may, for example, be implemented in a manner discussed above in connection with the MIME handler plug-in 270.

In the above examples discussed in connection with FIG. 2A and/or FIG. 2B, various components discussed are selectively implemented with programmed processing arrangements running software-based programs. For example, the MIME handler plug-in/transcoder 270 is selectively implemented with a personal computer at a user's home location, coupled to the Internet and adapted for communication with the network-based server components 230. Similarly, the asset-space plug-in 260 and the Agent application 250 and the third-party application 265 (e.g., a data, graphics, video or word processing application) are all selectively implemented using a software application running, for example, on an appropriately programmed personal computer. Furthermore, the asset space 280 can be implemented on a hard drive storage arrangement associated with a personal computer as discussed above, either locally (e.g., internally in a common computer housing) or remotely connected via a communications link such as a network link, the Internet 220, LAN (local area network) or a USB (universal serial bus) link.

The various embodiments described above and shown in the figures are provided by way of illustration only and should not be construed to limit the invention. Based on the above discussion and illustrations, those skilled in the art will readily recognize that various modifications and changes may be made to the present invention without strictly following the exemplary embodiments and applications illustrated and) described herein. For example, the functions carried out by host and home network nodes are selectively moved from host to home and/or home to host node, depending upon the application. This type of approach is consistent, for example, with a network-distributed data router having portions thereof implemented on both a host server and a home node, with the functions of the data router being carried out at one or both of the host and home locations. As another example, the interface provided to remote users may involve certain client-based functions and other implementations at the remote user's network access appliance, such as where the "remote" user is another home user node accessing a different home user node (with software implemented at both nodes). These approaches are implemented in connection with various example embodiments of the present invention. Such modifications and changes do not depart from the true spirit and scope of the present invention that is set forth in the following claims.

What is claimed is:

1. An apparatus comprising:
   at least one processor; and
   at least one memory including computer program code,
   the at least one memory and the computer program code configured to, with the at least one processor, cause the apparatus to perform at least the following,
   receive an authenticated data transfer request,
   load an asset space plug-in for each particular application to which the application-specific data applies, and implement each of the asset space plug-in to access metadata to identify application-specific data corresponding to the request;
   transcode the identified application-specific data from a first format type to a second Internet-communication format type, the first format type being executable by a first software application, the second format type being compatible with a second software application at one of a plurality of remote network appliances; and
   determine to transmit the transcoded data to the one of a plurality of remote network appliances.

2. An apparatus of claim 1, wherein the apparatus is further caused to access metadata created by a program application to identify application-specific data corresponding to the request, the application-specific data created by the program application, and to transcode the identified application-specific data from a first format type of the program application to the second format type.

3. An apparatus of claim 2, wherein the apparatus is further caused to transcode the identified application-specific data from a first format type of the program application to the second format type by rasterizing the application-specific data into data viewable with a web browser application at the one of the remote network appliances.

4. An apparatus of claim 1, wherein the apparatus is further caused to transcode the identified application-specific data from the first format type to the second Internet-communication format type by transcoding the data into a multipurpose internet mail extensions (MIME) type format that is compatible with the one of the remote network appliances.

5. An apparatus of claim 4, wherein the asset space plug-in iterates MIME handlers in a random order to find a handler for transcoding the identified application-specific data from the first format type to the second Internet-communication format type, and
   when no handle is applicable, determining to return the identified application-specific data un-transcoded.

6. An apparatus of claim 1, wherein the apparatus is further caused to load a data-formatting plug-in, for each particular application to which the application-specific data applies, to transcode data of the identified application-specific data type, the apparatus being further caused to implement each data formatting plug-in to transcode identified application-specific data from a first format type to a second Internet-communication format type that is compatible with the one of the remote network appliances.

7. The apparatus of claim 6, wherein the data-formatting plug-in is a multipurpose internet mail extensions (MIME) handler plug-in adapted to transcode the identified application-specific data from a first MIME type to a second MIME type that is capable of being displayed at the one of the remote network appliances.

8. An apparatus of claim 1, wherein the apparatus is further caused to send the transcoded data to a remote network appliance from which the authenticated request was sent.

9. An apparatus of claim 1, wherein the apparatus is further caused to remove from the identified application-specific data a digital rights management protection un-useable at the one of the remote network appliances and apply another digital rights management protection usable at the one of the remote network appliances.

10. An apparatus of claim 1, wherein the apparatus is further caused to transcode the identified application-specific data from a first format type to a second Internet-communication format type that is compatible for viewing with an Internet browser application at the one of the remote network access appliances.

11. An apparatus of claim 1, wherein the data transfer request involves one or more physical asset spaces, one or more virtual asset spaces, or a combination thereof, and the apparatus is further caused to selectively integrate the involved asset spaces into one virtual asset space.

12. An apparatus of claim 11, wherein the integrated virtual asset space includes data located in one or more local storages, one or more remote storages, or a combination thereof.

13. An apparatus of claim 1, wherein the apparatus is further caused to respond to authenticated requests specifying a metadata-based characteristic of data to be routed by identifying application-specific data having metadata that corresponds to the specified metadata-based characteristic.

14. An apparatus of claim 1, wherein the apparatus is further caused to present selections to a user at the one of the remote network appliances, the selections grouping stored application-specific data as a function of metadata for the stored application-specific data, a data router adapted to respond to authorized requests identifying one of the presented selections by identifying the application-specific data as the group of stored application-specific data corresponding to the selection.

15. An apparatus of claim 14, wherein the apparatus is further caused to populate at least one asset space as a function of metadata characterizing the stored application-specific data, and to present the selections to a user at the one of the remote network appliances by presenting the at least one asset space as a selection.

16. An apparatus of claim 1, wherein the associated data transfer request is as a function of token data, and wherein the apparatus is further caused to identify application-specific data corresponding to the request by identifying application-specific data using metadata characterized in the token data.

17. An apparatus of claim 16, wherein each remote network appliance is configured to accept token data from a base network appliance user, and to pass the accepted token data to a network server as part of a data transfer request, the token data including information specifying application-specific data to be made available to the remote network appliance, wherein the data router is configured to use metadata to identify applications-specific data specified in the token data.

18. An apparatus of claim 1, wherein the apparatus is further caused to facilitate the communication of data from a remote network appliance and to direct the configuration and storage of the communicated data as a function of metadata of a third-party program application.

19. An apparatus of claim 18, wherein the apparatus is further caused to direct the configuration and storage of the communicated data as a function of metadata-based selections made for the data by a user at the remote network appliance.

20. An apparatus of claim 18, wherein the apparatus is further caused to assign metadata to the communicated data, the assigned metadata indicating that the communicated data was communicated from the remote network appliance.

21. An apparatus of claim 1, wherein the apparatus is further caused to
 present a display including metadata-based characterizations of data to a user at a particular remote network appliance, the metadata-based characterizations corresponding to metadata-based characterizations for data at a base network appliance, and
 direct the configuration and storage of data communicated from the particular remote network appliance to the base network appliance as a function of metadata-based selections made by the user at the particular remote network appliance in response to the presented display.

22. An apparatus of claim 1, wherein the apparatus is further caused to present an interface to a user at a particular remote network appliance, the interface adapted to
 enable the user to navigate through stored data at a base network appliance as a function of metadata for an application to which the stored data applies, and
 generate a request for stored data presented via the navigation in response to user input at the particular remote network appliance.

23. An apparatus of claim 1, wherein
 the apparatus includes a base network appliance that is a personal computer connected to the Internet, the personal computer having a software implementation of a data router, and
 a network server communicates with the personal computer over the Internet to control the personal computer and the software-implemented data router to carry out the steps of identifying application-specific data corresponding to the request, transcoding the identified application-specific data, and sending the transcoded data to the one of the remote network appliances.

24. An apparatus of claim 1, wherein
 the application-specific data includes data that requires a specific software program for accessing and viewing the data, and
 the apparatus is further caused to transcode the application-specific data into a format that is viewable using a different software program that, absent the transcoding, is unable to access and present the data in a viewable form.

25. An apparatus of claim 1, wherein the apparatus is further caused to use metadata that groups data in different formats together under a data grouping identification, and to use the grouping identification to identify the application-specific data corresponding to the request.

26. An apparatus of claim 1, wherein the apparatus is further caused to
 add user-defined metadata to application-specific data,
 organize the application-specific data into logical collections, where a collection is defined as the set of entries that have the same value for some piece of metadata, and
 use the user-defined metadata to identify the application-specific data corresponding to the request.

27. An apparatus of claim 1, wherein a network server is configured to control the operation of the apparatus.

28. A method comprising:
 receiving an authenticated data transfer request;
 loading an asset space plug-in for each particular application to which the application-specific data applies, and implementing each of the asset space plug-in to access metadata to identify application-specific data corresponding to the request;
 transcoding the identified application-specific data from a first format type to a second Internet-communication format type, the first format type being executable by a first software application, the second format type being compatible with a second software application at one of a plurality of remote network appliances; and
 determining to transmit the transcoded data to the one of a plurality of remote network appliances.

29. The method of claim 28, further comprising:
 accessing metadata created by a program application to identify application-specific data corresponding to the request, the application-specific data created by the program application, and wherein transcoding includes transcoding the identified application-specific data from a first format type of the program application to the second format type.

30. The method of claim 29, wherein transcoding includes rasterizing the identified application-specific data into data viewable with a web browser application at the one of the remote network appliances.

31. The method of claim 28, wherein transcoding includes transcoding the identified application-specific data into a multipurpose internet mail extensions (MIME) type format that is compatible with the one of the remote network appliances.

32. The method of claim 28, wherein transcoding includes configuring the identified application-specific data for presenting to a user at the one of the remote network appliances as a function of a program application available at the one of the remote network appliances.

33. The method of claim 28, wherein transcoding includes transcoding the identified application-specific data from a first format type to a second Internet-communication format type that is compatible for viewing with an Internet browser application at the one of the remote network access appliances.

34. A method comprising:
populating at least one asset space with an identification of data stored at a base network appliance as a function of metadata stored at a base network appliance and an authenticated user associated with a remote network appliance;
presenting the at least one asset space to the authenticated user for use in selecting stored data for transfer; and
in response to receiving a request for data identified in the asset space,
transcoding the data from a first multipurpose internet mail extensions type into a second multipurpose internet mail extensions type as a function of an application program available at a remote network appliance identified in the request, the first multipurpose internet mail extensions type being compatible with a first software application that is not available at the remote network appliance and the second multipurpose internet mail extensions type being compatible with a different software application programmed on the remote network appliance, and
determining to transmit the transcoded data to the remote network appliance.

35. A non-transitory computer-readable storage medium carrying one or more sequences of one or more instructions which, when executed by one or more processors, cause an apparatus to at least perform the following steps:
receiving an authenticated data transfer request;
loading an asset space plug-in for each particular application to which the application-specific data applies, and implementing each of the asset space plug-in to access metadata to identify application-specific data corresponding to the request;
transcoding the identified application-specific data from a first format type to a second Internet-communication format type, the first format type being executable by a first software application, the second format type being compatible with a second software application at one of a plurality of remote network appliances; and
determining to transmit the transcoded data to the one of a plurality of remote network appliances.

* * * * *